US008311336B2

(12) United States Patent
Sakamoto et al.

(10) Patent No.: US 8,311,336 B2
(45) Date of Patent: Nov. 13, 2012

(54) COMPOSITIONAL ANALYSIS METHOD, IMAGE APPARATUS HAVING COMPOSITIONAL ANALYSIS FUNCTION, COMPOSITIONAL ANALYSIS PROGRAM, AND COMPUTER-READABLE RECORDING MEDIUM

(75) Inventors: Yasuhiro Sakamoto, Fujisawa (JP);
Masahiko Inakage, Tokyo (JP);
Kentaro Harada, Yokohama (JP)

(73) Assignees: Keio University, Tokyo (JP); Olympus Corporation, Tokyo (JP)

( * ) Notice: Subject to any disclaimer, the term of this patent is extended or adjusted under 35 U.S.C. 154(b) by 511 days.

(21) Appl. No.: 12/503,370

(22) Filed: Jul. 15, 2009

(65) Prior Publication Data

US 2009/0274370 A1 Nov. 5, 2009

Related U.S. Application Data

(63) Continuation of application No. PCT/JP2008/063789, filed on Jul. 31, 2008.

(30) Foreign Application Priority Data

Aug. 3, 2007 (JP) ................................. 2007-202876

(51) Int. Cl.
*G06K 9/46* (2006.01)

(52) U.S. Cl. ...................................... 382/190; 382/103

(58) Field of Classification Search .................. 382/103, 382/190
See application file for complete search history.

(56) References Cited

U.S. PATENT DOCUMENTS

| 5,873,007 | A | 2/1999 | Ferrada Suarez |
| 6,412,054 | B1 * | 6/2002 | Bhatia et al. .................. 711/170 |
| 6,714,679 | B1 * | 3/2004 | Scola et al. ................... 382/199 |
| 8,037,051 | B2 * | 10/2011 | Franks et al. ................. 707/708 |
| 8,112,712 | B2 | 2/2012 | Matsumoto |
| 2002/0020747 | A1 * | 2/2002 | Wakamiya et al. ...... 235/462.11 |
| 2004/0090437 | A1 * | 5/2004 | Uesaki et al. ................. 345/420 |
| 2004/0105010 | A1 * | 6/2004 | Osen .......................... 348/211.7 |
| 2004/0105090 | A1 * | 6/2004 | Schultz et al. ............. 356/141.5 |
| 2007/0071404 | A1 * | 3/2007 | Curtner et al. .................. 386/95 |
| 2008/0225121 | A1 * | 9/2008 | Yoshida et al. ............... 348/159 |

FOREIGN PATENT DOCUMENTS

| CN | 1497938 A | 5/2004 |
| EP | 1 408 452 A2 | 4/2004 |
| EP | 1 612 721 A1 | 1/2006 |
| GB | 2 370 438 A | 6/2002 |
| JP | 2002-218306 | 8/2002 |
| JP | 2007-188283 | 7/2007 |

OTHER PUBLICATIONS

Extended Supplementary European Search Report dated Feb. 19, 2010.
Chinese Office Action dated Jul. 11, 2012 in related Chinese Patent Application No. 200880008721.

* cited by examiner

*Primary Examiner* — Gregory M Desire
(74) *Attorney, Agent, or Firm* — Scully, Scott, Murphy & Presser, P.C.

(57) ABSTRACT

A technology is disclosed for easily executing a compositional analysis to obtain a preferred composition. Image data is acquired, the image data is analyzed, and a plurality of composition lines expressing the feature of the image data on the composition are acquired. On the composition formed of the plurality of acquired composition lines, the ratio of lengths of two sides selected from the plurality of sides in the region partitioned by the plurality of composition lines is detected to be a specified value (for example, the golden ratio).

3 Claims, 25 Drawing Sheets

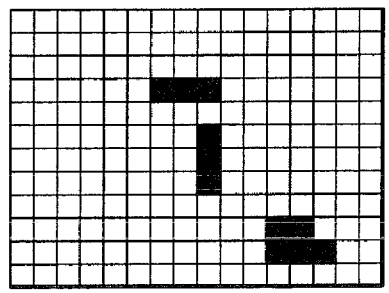
F I G. 5A
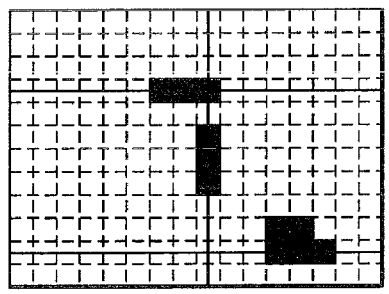
F I G. 5B
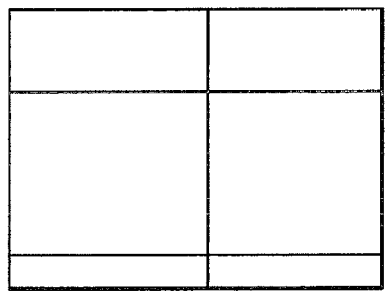
F I G. 5C

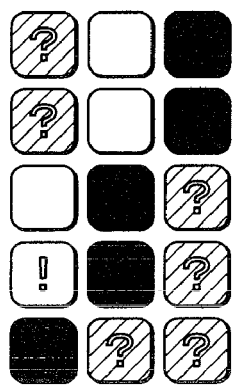
21
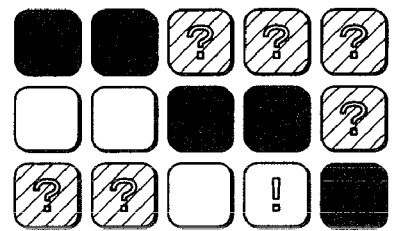
22
F I G. 8
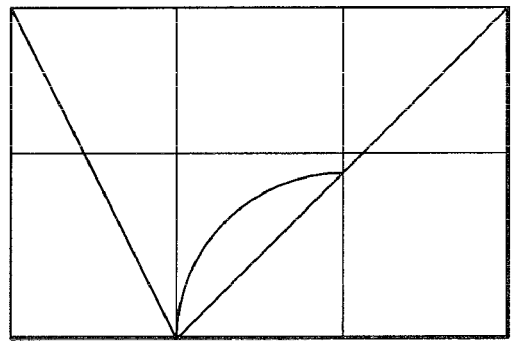
F I G. 9A
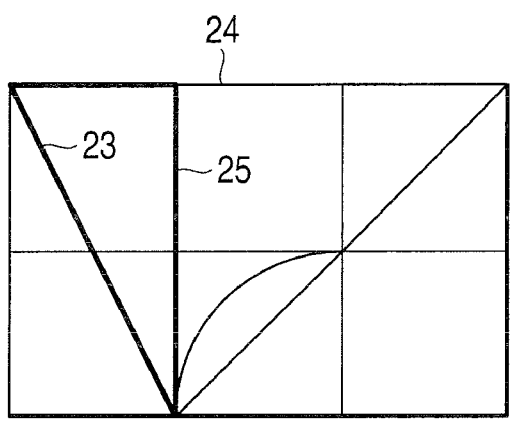
F I G. 9B

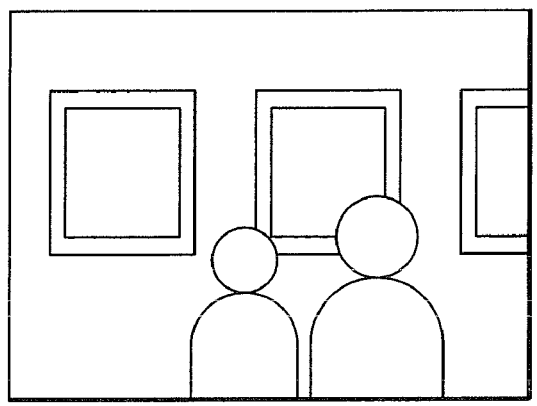
F I G. 16A
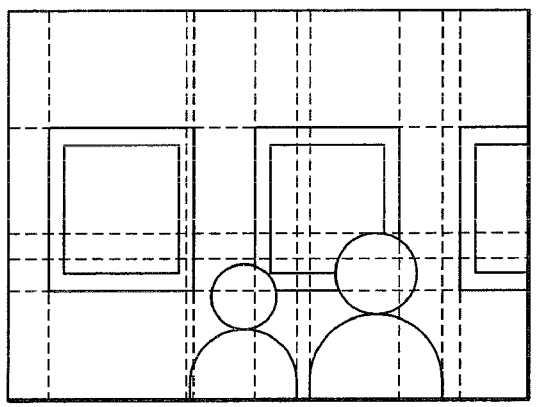
F I G. 16B
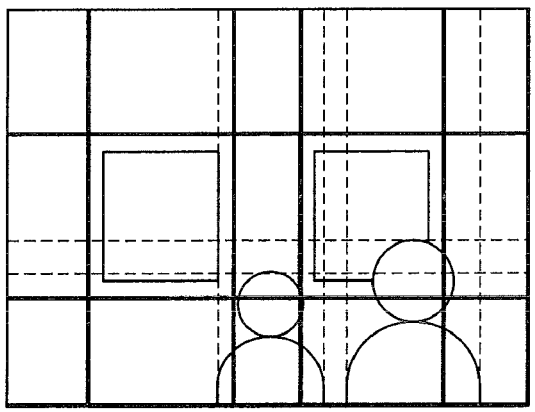
F I G. 16C (0,1)   (0,10)

(0,1)

(0,1)

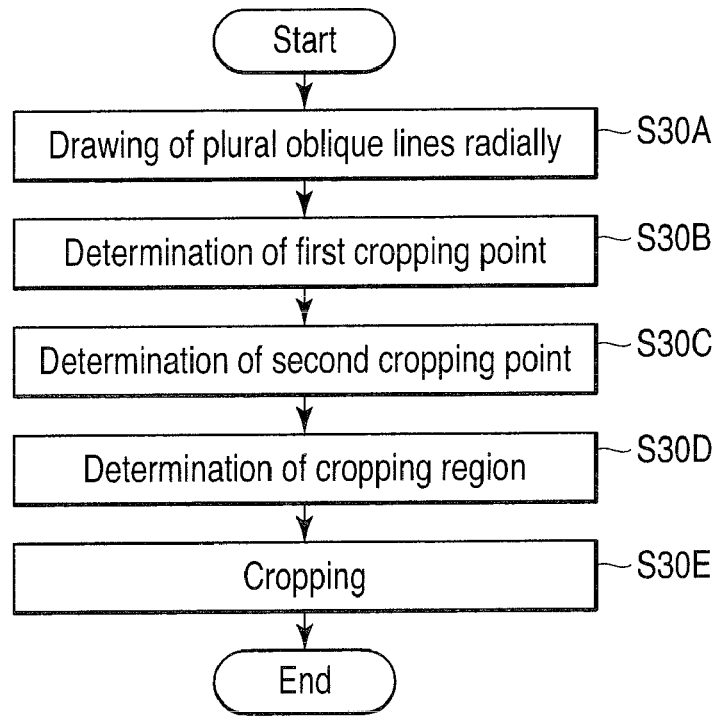
F I G. 24
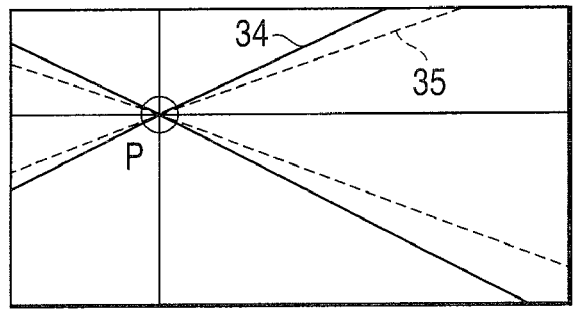
F I G. 25A
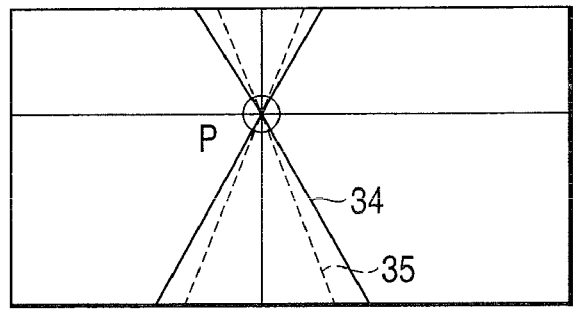
F I G. 25B

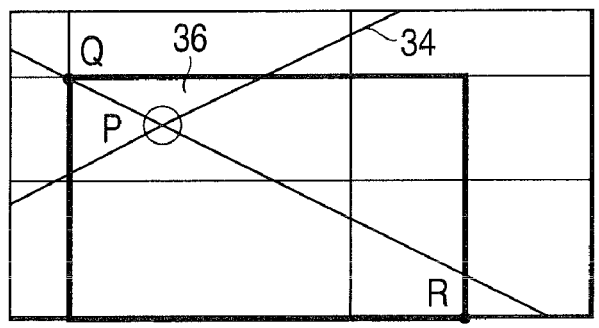
F I G. 27D
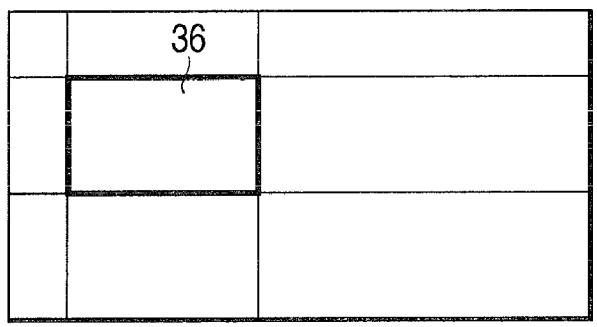
F I G. 28A
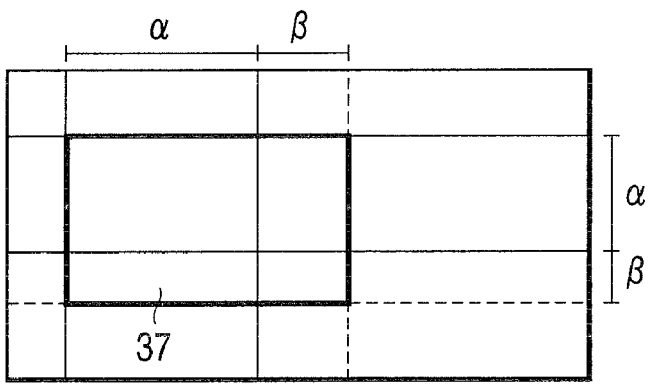
F I G. 28B

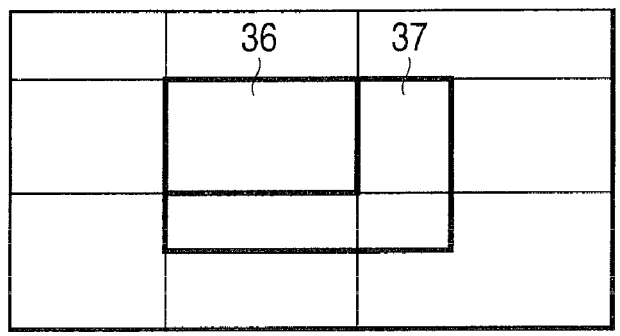
F I G. 29A
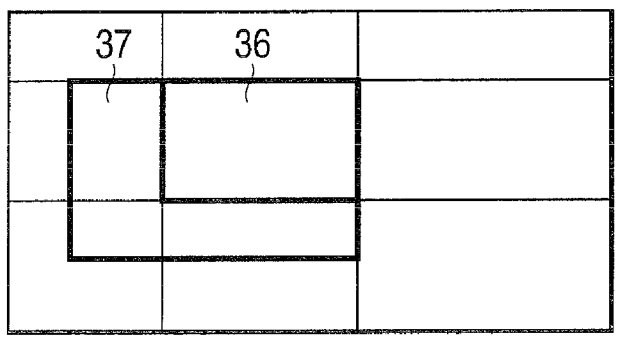
F I G. 29B
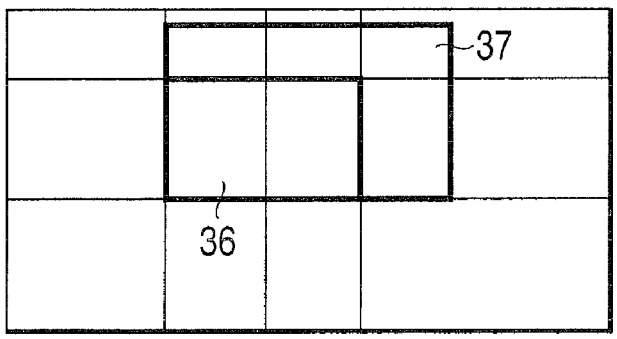
F I G. 29C

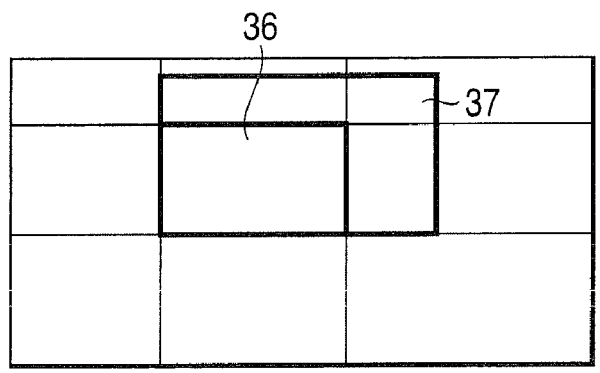
F I G. 29D
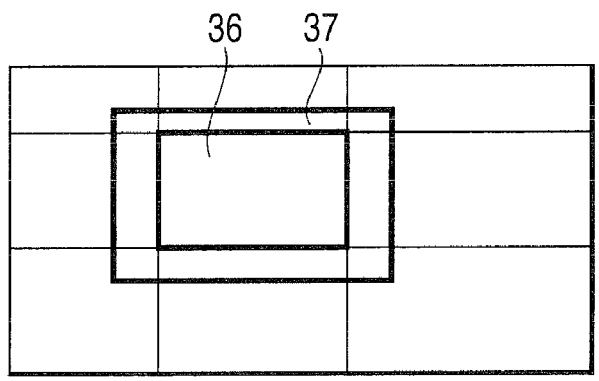
F I G. 29E
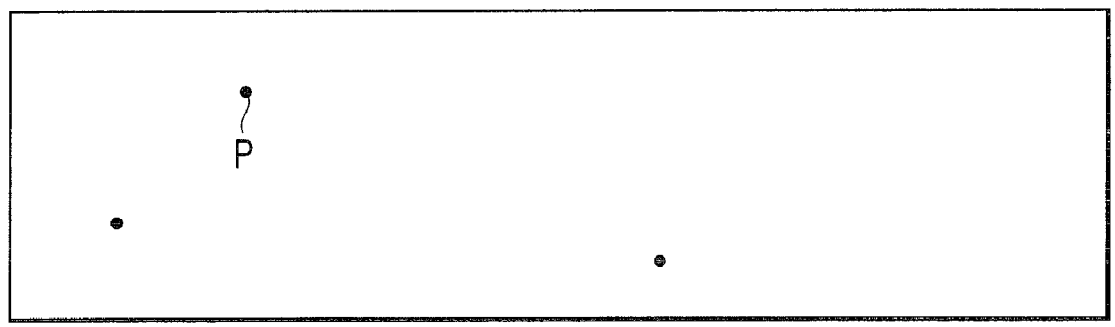
F I G. 30A

COMPOSITIONAL ANALYSIS METHOD, IMAGE APPARATUS HAVING COMPOSITIONAL ANALYSIS FUNCTION, COMPOSITIONAL ANALYSIS PROGRAM, AND COMPUTER-READABLE RECORDING MEDIUM

CROSS REFERENCE TO RELATED APPLICATIONS

This is a Continuation Application of PCT Application No. PCT/JP2008/063789, filed Jul. 31, 2008, which was published under PCT Article 21(2) in Japanese.

This application is based upon and claims the benefit of priority from prior Japanese Patent Application No. 2007-202876, filed Aug. 3, 2007, the entire contents of which are incorporated herein by reference.

BACKGROUND OF THE INVENTION

1. Field of the Invention

The present invention relates to a compositional analysis method for analyzing a composition in an image, or an image apparatus implementing this compositional analysis method. The compositional analysis method may be also implemented on a structural analysis program recorded in a computer-readable recording medium. Preferred examples of the image apparatus include a digital camera, a digital video camera, or image display devices such as a digital signage or a photoframe.

2. Description of the Related Art

Composition is important for an image. The composition is also known as arrangement, disposition, layout, proportion, or balance.

Several techniques for providing preferred compositions in the image have been proposed.

For example, the image recording and editing apparatus disclosed in Jpn. Pat. Appln. KOKAI Publication No. 2002-218306 incorporates a template expressing a preferred composition preliminarily in the apparatus. This image recording and editing apparatus extracts contour line information of a subject by image processing from an acquired image, calculates the differential portion of the contour line information from the template, and drives the zoom lens so as to minimize the differential portion. According to this technique, the subject of a human figure or the like can be imaged in a size matched well to the template. As a result, an image of a pleasing composition is often obtained.

On the other hand, hitherto, the golden ratio is known as an aesthetically pleasing ratio. The golden ratio is a ratio of 1: $(1+\sqrt{5})/2$, and its approximate value is 1:1.618, or about 5:8. A Fibonacci sequence of numbers is a sequence defined by $F_1=1$, $F_2=1$, $F_{n+2}=F_n+F_{n+1}$, and it is known that the ratio of two adjacent terms in a Fibonacci sequence of numbers converges on the golden ratio.

As often seen among Western paintings in the Renaissance period, when determining the composition or the proportion, the geometrical configuration represented by the golden ratio has been considered as an important element.

Another example of an aesthetically pleasing ratio is the silver ratio. The silver ratio refers to either 1: $(1+\sqrt{2})$ or 1:$\sqrt{2}$. The silver ratio is excellent aesthetically, and also has an advantage that halving a rectangular shape having the silver ratio longitudinally produces a similar shape to the original rectangle. Mainly for this reason, a representative application of the silver ratio is found in the paper format size (A4, A3, etc.).

When determining a preferred ratio, other viewpoints than the aesthetic aspect are also known. For example, when an acquired image is to be reproduced by a high-definition television, the aspect ratio of the high-definition television must be taken into consideration when image acquisition, and it is preferred that the subject be located in a good balance within the image acquiring range of this aspect ratio.

BRIEF SUMMARY OF THE INVENTION

The invention is intended to acquire a plurality of line segments (composition lines) representing the features of image data on the composition, and to analyze the ratio of lengths of two sides selected from the plurality of sides in the regions partitioned by the composition lines.

In the invention, in analysis of composition, the dimension of the subject and the background of a two-dimensional element in the image data is reduced, and rendered to one-dimensional composition lines. Since the quantity of data is reduced, specific details of the image data are omitted, and structural features of the image data can be represented by a smaller quantity of data. That is, the entire features of the image can be expressed by a smaller operational power.

Also in the invention, paying attention to a region partitioned by the composition lines, the shape of this region is recognized from the viewpoint of "ratio." Since this ratio is a scalar, the entire composition of image data can be understood quantitatively.

Examples of the ratio include, but are not limited to, the golden ratio, the silver ratio, and the aspect ratio of monitor. For example, when the golden ratio or the silver ratio is selected as the ratio, the composition of the image data can be analyzed from an aesthetic point of view.

In other optional features preferred but not essential for the invention, whole or part of the acquired composition lines can be displayed to the user. As the means for display, for example, the image data is displayed on the monitor of the apparatus of the invention, and the acquired composition lines may be superposed and displayed in the image data. As a result, the user of the invention can correctly recognize the presence of composition lines as the foundation of compositional analysis.

In this case, to improve the recognition by the user, various efforts may be attempted. For example, it may be effective to display only the composition lines for generating a region in which a specified ratio is detected (region defining composition lines), or emphasize the region defining composition lines compared with other composition lines. Besides, the region generated by the region defining composition lines may be emphasized (for example, among region defining composition lines, only the surrounding area of the region may be displayed or emphasized).

Composition lines may be acquired in various methods. For example, by extending the boundary lines of the region in the image, composition lines may be obtained. For instance, lines of ends of wall, table or building in the image are extended. Alternatively, the central line of a human figure or the central line of a tree may be obtained as a composition line. Further, straight lines or simple curved lines approximating lines of a complicated shape may be obtained as composition lines. The line segment dividing a region in an image by the golden ratio may be utilized. Methods of acquiring the composition lines are not limited to these methods alone. The composition lines may be drawn to the ends of the screen or drawn halfway.

In other optional applications preferred but not essential for the invention, by utilizing the results of compositional analysis of the image of the invention, a partial region is extracted from a wide image region. For example, when image data having a wide region is displayed on a high-definition television, a partial region is extracted from the wide image region, and only this partial region is displayed in the entire screen of the high-definition television, or the partial region may be zoomed up to be displayed. In this case, by utilizing the results of the compositional analysis of the invention, a preferred partial region may be selected by a specified standard (for example, an aesthetic scale).

Alternatively, by utilizing the results of the compositional analysis of the invention, a moving image may be created in which a plurality of preferred partial regions are selected, and the plurality of partial regions are displayed as if they were imaged by a camera continuously (without changeover).

In further optional applications preferred but not essential for the invention, by utilizing the results of compositional analysis of the image of the invention, the user of the image acquisition apparatus (for example, the digital camera, camcorder, digital video camera) or the editing apparatus for the image acquired the image acquisition apparatus may be advised of the composition when acquiring images.

The compositional analysis method of the invention includes, for example, a step of acquiring image data, a step of analyzing the image data and acquiring a plurality of line segments expressing the features of the image data on the composition, a step of detecting a region partitioned by the plurality of line segments on the composition formed by the plurality of obtained line segments, and a step of analyzing the ratio of lengths of two sides selected from a plurality of sides in the detected region.

The present invention may be also understood as an invention of an image apparatus having such function of executing the structural analysis method, for example, a digital camera. It may be further understood to be an invention of a program for causing a computer to execute such structural analysis method, or a computer-readable recoding medium having recorded therein such program.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5A is a diagram showing an image including pixels to be analyzed in the composition.

FIG. 5B is a diagram showing a mode of acquiring three composition lines in the pixel of boundary lines of the image to be analyzed.

FIG. 5C is a diagram extracting and showing only the three acquired composition lines.

FIG. 8 is a diagram showing two types of structure detection module for detecting golden ratio oblique lines.

FIG. 9A is a diagram showing an example of a composition obtained from the image to be analyzed.

FIG. 9B is a diagram showing results of processing to match the composition better than in the composition in FIG. 9A.

FIG. 16A is a diagram showing an example of a live view displayed on a monitor.

FIG. 16B is a diagram showing an example of a live view displayed by superposing a plurality of acquired composition lines.

FIG. 16C is a diagram showing an example of a live view displayed by superposing a plurality of composition lines including composition lines in which the golden ratio is detected.

FIG. 24 is a flowchart for explaining the process for calculating a cropping region corresponding to designation points.

FIG. 25A is a diagram showing a mode of subtracting golden ratio oblique line and 16:9 oblique line from designation points when the inclination is small.

FIG. 25B is a diagram showing a mode of subtracting golden ratio oblique line and 16:9 oblique line from designation points when the inclination is large.

FIG. 27D is a diagram showing yet another decision example of the second cropping point.

FIG. 28A is a diagram showing a region determined by the first and second cropping points.

FIG. 28B is a diagram showing a cropping region expanded further from the region in FIG. 28A on the basis of a proportion of golden ratio.

FIG. 29A is a diagram of a first example of positional relation between a cropping region and an original region.

FIG. 29B is a diagram of a second example of positional relation between a cropping region and an original region.

FIG. 29C is a diagram of a third example of positional relation between a cropping region and an original region.

FIG. 29D is a diagram of a fourth example of positional relation between a cropping region and an original region.

FIG. 29E is a diagram of a fifth example of positional relation between a cropping region and an original region.

FIG. 30A is a diagram showing setting of a plurality of designation points.

DETAILED DESCRIPTION OF THE INVENTION

Best modes for carrying out the invention will be described below with reference to the accompanying drawings.

In the following embodiments, the golden ratio is adopted as a most preferred embodiment, but it is only an example, and the invention is not limited to this alone. Aside from the golden ratio, the silver ratio and other ratios may be similarly applied.

[First Embodiment]

In the first embodiment, a plurality of composition lines are acquired from the acquired image data, and the ratio of lengths of two sides selected from a plurality of sides of a region partitioned by the composition lines is analyzed. Specifically, the ratio of lengths of the sides is detected to be within a specified range, and the composition is modified so that the ratio may be closer to the golden ratio. In the first embodiment, by utilizing the composition after the modification, a dynamic animation is created.

Figure 1:
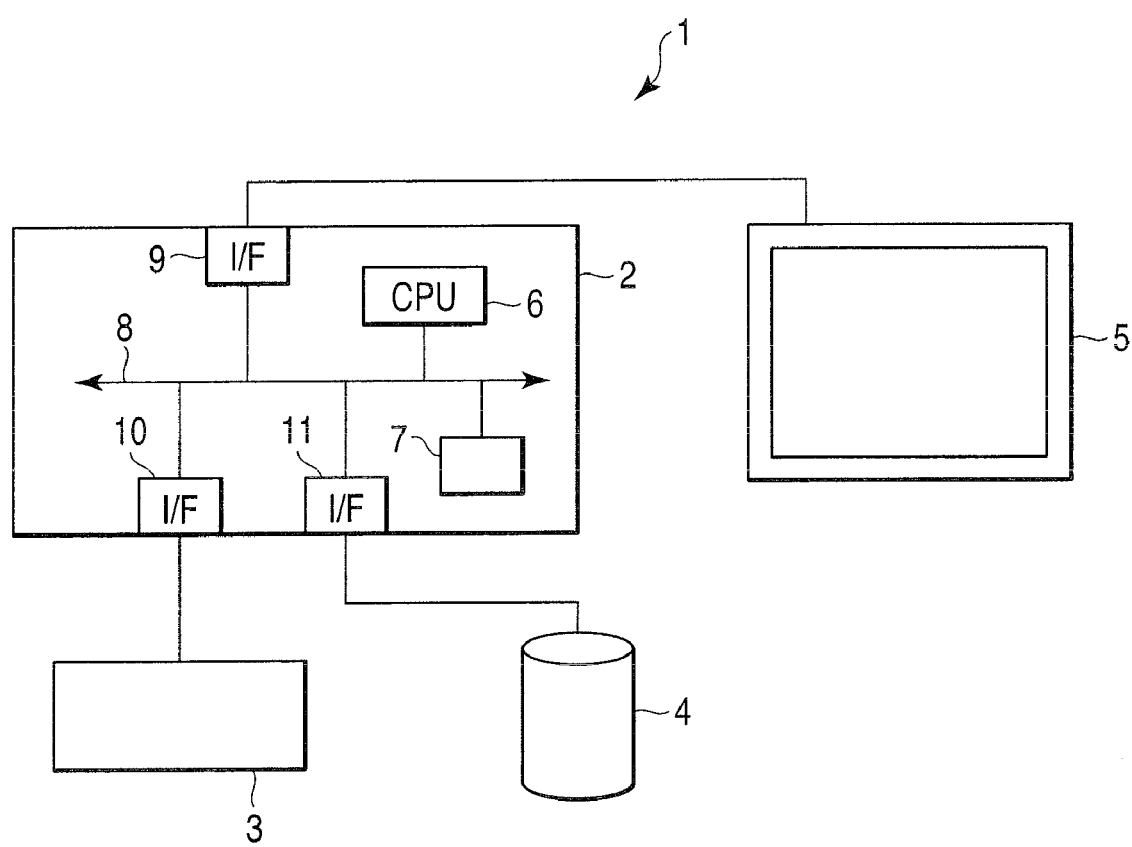
FIG. 1 is a block diagram of a computer system as an image apparatus according to a first embodiment of the invention.

As shown in FIG. 1, as the image apparatus according to the first embodiment of the invention, a computer system 1 includes a computer main body 2, a keyboard 3, an external storage device 4, and a display 5. The computer main body 2 has a CPU 6 connected to a memory 7 by way of a data bus 8. The CPU 6 is further connected to an interface (I/F) 10 for input device, an interface 11 for external storage device, and an interface 9 for external display by way of the data bus 8. The keyboard 3 is connected to the interface 10 for input device. The external storage device 4 is, for example, an external hard disk drive (HDD), and is connected to the interface 11 for external storage device. The display 5 is, for example, a high-definition display device, and is connected to the interface 9 for external display.

The external storage device 4 is connected to the computer main body 2 by way of a cable in this embodiment, but may be connected via a network. For example, a server on the Internet may be used as the external storage device 4.

A plurality of image data are stored in the external storage device 4. In the memory 7, which is a computer-readable recording medium, a compositional analysis program for realizing the compositional analysis method of the invention is recorded.

In the computer system 1 having such configuration, when a user executes a specified operation, the compositional analysis program is read out from the memory 7, and is executed.

The operation of the CPU 6 for executing the compositional analysis program will be explained below by referring to FIG. 2.

(1) Step S1 Reading of Image

When the user manipulates the keyboard 3 and executes a specified operation, the CPU 6 fetches desired image data from the plurality of image data stored in the external storage device 4, and reads the fetched data into the memory 7 inside the computer main body 2. The entered image data becomes the subject to be processed by the compositional analysis program.

In this case, the image may be either still or moving. In the case of a moving image, the data may be read by reducing the rate (number of frames per unit time) to a frame rate suited to the processing capacity of the CPU 6. In this embodiment, a still image is handled in the following explanation.

(2) Step S2 Grayscale formation From Image

The color of the image is converted into a grayscale. This is a preparatory step for extracting the contour of the image in the succeeding steps. In this embodiment, the brightness of each pixel of the image is divided into 256 stages, and a grayscale is formed.

The formation method of the grayscale is not particularly specified. For example, the grayscale may be divided into smaller stages or into more rough stages. Depending on the type of the image, only a specific color component may be extracted, and a grayscale may be formed on the basis of the intensity of this color component. For example, if the main subject is emphasized in the yellow color component, a grayscale may be formed only by the intensity of the yellow color component for the purpose of not evaluating the structure of the background as much as possible.

If the color component is taken into consideration in the contour extraction of the image in the following steps, step S2 may be omitted.

(3) Step S3 Size Change of Image

Next, in consideration of processing capacity of the CPU 6 or the definition of the display 5, the detail of the image is changed. In the embodiment, the number of pixels can be selected properly by the user from five stages, i.e., 64×48, 96×72, 128×96, 320×240, and 640×480. Of course, if exceeding 640×480, a proper image size is determined depending on the environment of execution of this compositional analysis program. As long as permitted by the processing capacity, without changing the image size at this step, the size of the image being read may be directly employed.

(4) Step S4 Binary Coding of Image

For the purpose of enhancing the processing speed by facilitating the image processing, the image is coded by binary processing. In this embodiment, by utilizing the result of grayscale formation executed in step S2, the intermediate value of maximum scale value Imax and minimum scale value Imin of all pixels of the processed image is determined as the threshold. If the scale value is higher (brighter) than or equal to the threshold, the corresponding pixel is white (value of 1), and otherwise the pixel is black (value of 0).

However, the binary coding method is not particularly specified. For example, the threshold may be automatically determined by the compositional analysis program so that the rate of white and black pixels may be a specified ratio (for example, 4:1), it is applied to the grayscale value of each pixel, and the pixels may be divided into white or black.

(5) Step S5 Removal of Extraneities in Image and Complement

After the processes of grayscale formation of an image, size changing, and binary coding, artifacts may be left in the image as noise (extraneities) in a pixel conversion process. Such "extraneities" in the image may be also caused by dust sticking originally to the photoelectric conversion surface of an imager element when acquiring the image. Step S5 is intended to eliminate unnecessary image data left over as extraneities, and to complement the necessary image data.

Referring now to the drawing, removal of extraneities in the image and complement in the embodiment will be explained.

Figure 3A:
FIG. 3A is a diagram for explaining removal of extraneities in an image by an Othello algorithm, showing that a central pixel is black, and all eight surrounding pixels are white.
Figure 3B:
FIG. 3B is a diagram for explaining compensation of extraneities in an image by the Othello algorithm, showing that a central pixel is white, and all eight surrounding pixels are black.

In this embodiment, when eight surrounding pixels around one central pixel are all different from the central pixel in terms of black and white, the black or white of the central pixel is inverted. For example, as shown in FIG. 3A, if the central pixel is black and all eight surrounding pixels are white, the central pixel is inverted to be white (removal of an extraneity). Alternatively, as shown in FIG. 3B, if the central pixel is white and all eight surrounding pixels are black, the central pixel is inverted to be black (compensation of an extraneity). This algorithm is hereinafter called an Othello algorithm after the Othello game intended to invert black and white cells.

Figure 3C:
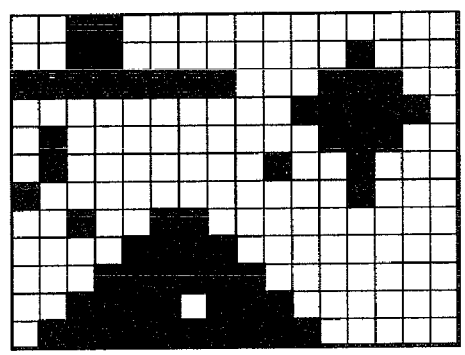
FIG. 3C is a diagram of an image before application of the Othello algorithm.
Figure 3D:
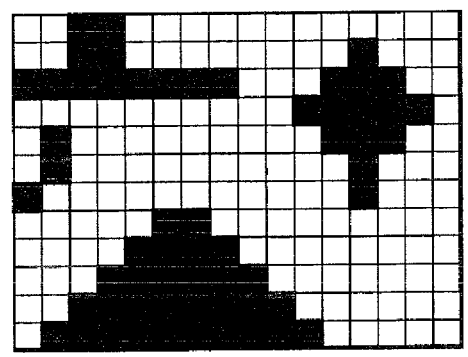
FIG. 3D is a diagram of an image after application of the Othello algorithm.

When this Othello algorithm is applied to the image shown in FIG. 3C, it becomes as shown in FIG. 3D. In FIG. 3D, unlike in FIG. 3C, there is no pixel different from eight surrounding pixels in color. As a result, the image is sharp and easy to see.

In the operation on an actual program, the shapes of FIGS. 3A and 3B are used as templates, and by matching with each region of the image in FIG. 3C, for example, the black or white color of the central pixel is inverted in the matched regions.

However, if extraneities are few in the image to be processed, or if existence of extraneities does not matter so much, step S5 may be skipped.

Alternatively, the unit of extraneity removal or compensation is not limited to the unit of one pixel in the embodiment, but a larger unit may be set for extraneity removal and compensation.

(6) Step 6 Composition Calculation and Extraction

Next, the composition is composed from the image data.

Figure 4A:
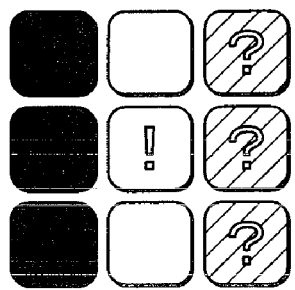
FIG. 4A is a diagram of a structure detection module.

In this embodiment, a structure detection module 12 as shown in FIG. 4A is used in the composition calculation. This structure detection module 12 is composed of nine cells (corresponding to pixels) arrayed in a square in the minimum unit. A condition is determined in each cell of the structure detection module 12, and the portion conforming to this condition is detected from the image to be processed.

In nine cells in the structure detection module 12, a cell with "!" mark shows the cell to be compared. A black cell is a cell not existing on the contour. A white cell is a cell on the contour. A cell with "?" mark is undecided (whether on the contour line or not).

In FIG. 4A, cells in the left side column are all black and are not on the contour, and cells in the central column are all white and are on the contour, and cells in the right side column are all undecided. Therefore, the structure detection module 12 in FIG. 4A has a function of detecting at least an image portion in which all cells in the central column are on the contour line and all cells in the left side column are not on the contour line. The cells in the right side column may be either present or absent on the contour line. Thus, the structure detection module 12 detects the contour line composed of three pixels arranged longitudinally, at least the left side not being on the contour line.

Figure 4B:
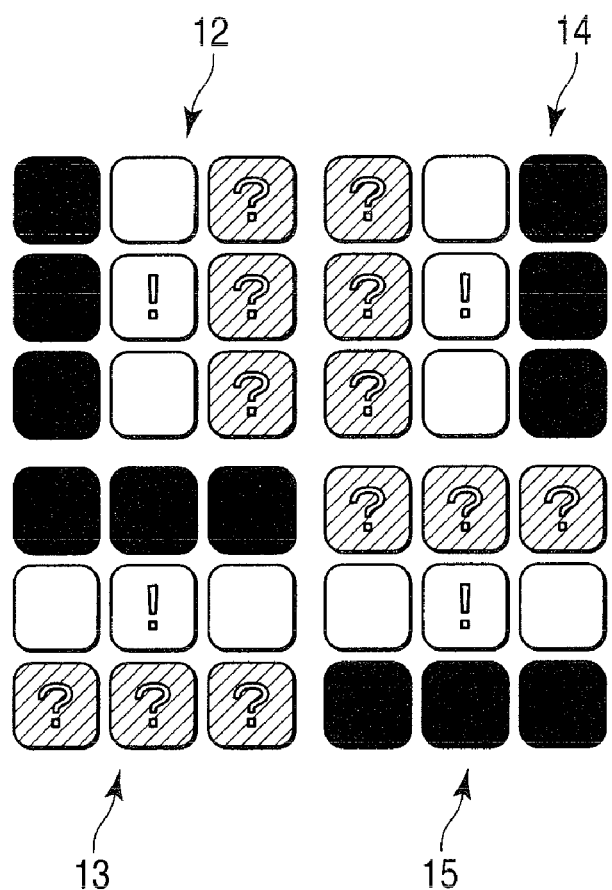
FIG. 4B is a diagram of four types of structure detection module including the structure detection module shown in FIG. 4A.

As shown in FIG. 4B, aside from the structure detection module 12 for detecting contour lines (perpendicular line and horizontal line) composed of three cells as shown in FIG. 4A, other types are shown. In FIG. 4B, the structure detection module 12 shown in the upper left corner is the same as shown in FIG. 4A. A structure detection module 13 shown in the lower left corner is intended to detect contour lines composed of three pixels arranged laterally, at least the upper side not on the contour line. A structure detection module 14 shown in the upper right corner is intended to detect contour lines composed of three pixels arranged longitudinally, at least the right side not on the contour line. A structure detection module 15 shown in the lower right corner is intended to detect contour lines composed of three pixels arranged laterally, at least the lower side not on the contour line.

Meanwhile, in order to detect contour lines from any one of upper, lower, right or left direction, in the embodiment, these four structure detection modules 12 to 15 are combined as one set.

In these structure detection modules 12 to 15, when a pixel satisfying the condition is discovered, it is processed as follows.

As shown in FIG. 5A, in the central portion of the image to be analyzed, there are boundary line for the portion of three pixels longitudinally, and in the upper portion, there are boundary line for the portion of three pixels laterally. In the lower right corner of the image, there are boundary line for the portion of two pixels laterally, and partly connected to these pixels, there are boundary line for the portion of three pixels laterally.

On such image in FIG. 5A, the above structure detection modules 12 to 15 are applied, and pixels conforming to the conditions of the structure detection modules 12 to 15 are searched for. As a result, continuous boundary lines of three or more pixels can be detected in the longitudinal or lateral direction. As a result of the detection, as shown in FIG. 5B, in the pixels of the boundary lines of the image to be analyzed, three straight lines (composition lines) are acquired. FIG. 5C is a diagram extracting only three acquired composition lines as a result of the detection.

Figure 6:
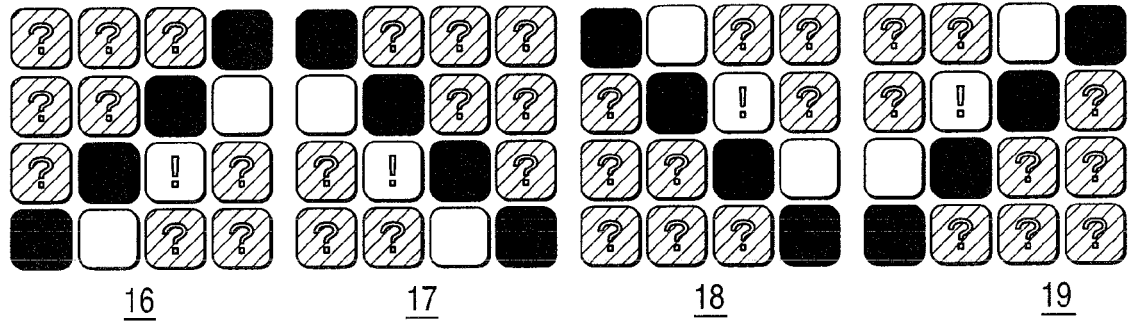
FIG. 6 is a diagram showing four types of structure detection module for detecting an oblique line.

The structure detection modules 12 to 15 shown in FIGS. 4A and 4B are square modules of 3×3, but only by these modules of minimum unit, it may be difficult to detect an important portion of the image in the composition. In such a case, the size of the structural modules may be expanded as shown in structure detection modules 16 to 19 shown in FIG. 6. These structure detection modules 16 to 19 are square modules of 4×4, and are intended to detect oblique lines.

Figure 7A:
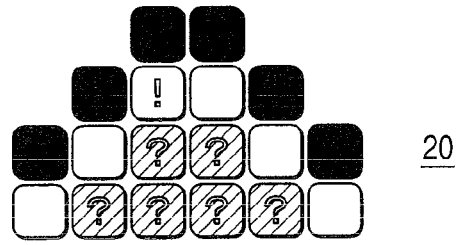
FIG. 7A is a diagram showing a structure detection module for detecting a curved line.
Figure 7B:
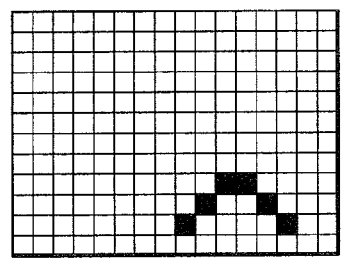
FIG. 7B is a diagram showing an example of an image having boundary lines (curved lines) to be detected by the structure detection module in FIG. 7A.
Figure 7C:
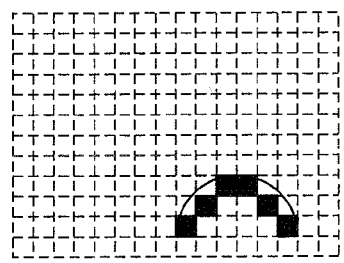
FIG. 7C is a diagram showing a mode of acquiring a composition line (curved line).

By further expanding the structure detection module, curved lines may be detected. As a result, compositional elements that cannot be detected by linear analysis alone can be also detected. FIG. 7A shows an example of a structure detection module 20 for detecting curved line. FIG. 7B is a diagram showing an example of an image having boundary line (curved line) that can be detected by this structure detection module 20. When the boundary line is detected by the structure detection module 20, composition line (curved line) is acquired as shown in FIG. 7C.

However, in detection of curved lines, it is necessary to determine the structure detection module in consideration of the number of pixels in the image to be analyzed. For example, in an image of 96×72 pixels and an image of 320× 240 pixels, different structure detection modules must be used in order to detect curved line of the same curvature.

It is also possible to use structure detection modules capable of detecting other lines than vertical straight line, lateral straight line, oblique line, or curved line.

FIG. 8 shows structure detection modules 21, 22 for detecting oblique line of the golden ratio (oblique lines having the same inclination as an oblique line in a rectangular triangle of the golden ratio in the ratio of lengths of a longitudinal side and a lateral side). The structure detection modules 21, 22 are dynamic modules changing in the number of constituent cells in gradual steps depending on the number of pixels in the image to be analyzed. The initial value is defined in a rectangle of 3×5 as shown in FIG. 8, but as the number of pixels in the image to be analyzed is increased, the number of constituent cells in the structure detection modules 21, 22 is increased. In this case, according to the Fibonacci sequence of numbers, the inclination of the oblique line to be detected is gradually approximated to the golden ratio.

Instead of dynamically changing the number of constituent pixels, a structure detection module may be preliminarily prepared in a plurality of stages. In this embodiment, structure detection modules of 12 stages are defined.

These structure detection modules 12 to 22 are used in the embodiment. Of course, other structure detection modules may be also used.

Furthermore, composition lines may be acquired by using other methods than structure detection modules. For example, supposing a binary original image of black and white, a complementary image is created by inverting black and white, and this complementary image is deviated by the portion of one pixel longitudinally or laterally, after which the negation of exclusive OR of every pixel of the original image and the complementary image is calculated, whereby the composition lines may be obtained (except for the composition line in the deviated direction). Alternatively, by executing Hough conversion, composition lines may be obtained from feature points in the image.

In the embodiment, edges of the image are not recognized as composition lines. However, the configuration may be modified so as to recognize the edges of the image as composition lines.

(7) Step S7 Determination of a Composition

In step S6, composition lines are obtained from the image to be analyzed. In step S7, a final composition is determined by a composition shaping algorithm for modifying the composition aesthetically. This step is intended to change only the detected composition, and even if the composition is changed, the image to be analyzed is not changed.

After step S6, for example, a composition as shown in FIG. 9A is obtained. This composition is created according to the following rules.

1. Composition lines are acquired in order of longitudinal line, lateral line, oblique line, and curved line.

2. Of the acquired composition lines, the straight lines (longitudinal line, lateral line, oblique line) are extended to the end of the image region.

3. Of the acquired composition lines, the curved lines are extended to the intersection with the straight composition lines.

In the first place, the CPU 6 corrects the distance and the relationship of the plurality of detected composition lines. In this correction, if an intersection or a contact point is present in a certain distance, the straight composition lines are moved to the most matched position. Further, extremely adjacent parallel lines are combined into one line. The curved composition lines are fixed.

In FIG. 9A, a curved line contacts with an oblique line at two points, and a lateral line is present near the upper contact point. When the lateral line comes onto the upper contact point, they are matched graphically, and therefore the lateral line is moved downward so that the lateral line sits on the contact point.

As a result, as shown in FIG. 9B, the number of regions partitioned by the composition lines in the image is decreased, and the shape of the region becomes much closer to the basic pattern. Thus, if at least one of the following is realized, that is, (a) the number of regions partitioned by the composition lines in the image is decreased, or (b) the shape of any region becomes much closer to the basic pattern, the composition is assumed to be more matched.

In the embodiment, if the moving distance of the straight line is within 8% of the diagonal line length of the image to be analyzed, the straight line is moved until the straight line comes onto the nearest intersection or contact point. When parallel lines are present in the image, if the distance between the lines is within 2% of the diagonal line length of the image, one straight line is moved onto the other straight line so that the two are combined into one straight line. This is, however, only an example, and the method of correction is not particularly specified. Not only a straight line, but a curved line may be also moved. Alternatively, in the case of a simple composition, this correction may be omitted.

The next step is to analyze the ratio of lengths of two sides selected from a plurality of sides of the region partitioned by the plurality of composition lines. Specifically, it is judged whether this ratio is within a specified range with respect to the golden ratio, and if it is within a specified range, the composition is changed so that the ratio may be much closer to the golden ratio.

In this embodiment, by the designation by the user, the degree of approximation to the golden ratio can be determined in gradual stages. As mentioned above, it is known that the ratio of two adjacent terms in a Fibonacci sequence of numbers converges on the golden ratio. By making use of this fact, the degree of approximation to the golden ratio may be determined in 15 stages, including a choice of "not adjusting the composition." Of course other variations are possible. For example, the platinum ratio may be used together with the golden ratio, or the number of stages may be 16 or more.

Specifically, supposing N and M of size N×M of the structure detection module for detection of golden ratio to be numbers in a Fibonacci sequence of numbers (1, 1, 2, 3, 5, 8, 13, 21, . . .), it is possible to prepare a plurality of structure detection modules different in the degree of approximation to the golden ratio in gradual stages. For example, the size of the structure detection modules 21, 22 for detection of oblique lines of the golden ratio shown in FIG. 8 is 3×5, and a next size of 5×8 and another next size of 8×13 are prepared.

In the composition in FIG. 9B, for example, suppose the oblique lines in the region are modified to conform to the golden ratio more closely. First, by applying the structure detection modules 21, 22 for golden ratio of 3×5 shown in FIG. 8, oblique lines are detected. At this time, an oblique line 23 at the left side in the diagram matches with the structure detection module. In other words, it is detected that the ratio of lengths of a lateral side 24 and a longitudinal side 25 having the oblique line 23 is close to the golden ratio. That is, the oblique line 23 is roughly detected to be an oblique line of golden ratio. Thus, when the structure detection modules 21, 22 for golden ratio of 3×5 match with the oblique line, the ratio of the lateral side 24 and the longitudinal side 25 of the triangle having the oblique line 23 is detected to be a specified value (within a specified range from the golden ratio).

Next, the structure detection module is changed to have a higher precision. At this time, if the oblique line 23 is not detected, the composition in FIG. 9B is changed, and the inclination of the oblique line 23 is changed to an inclination closer to the golden ratio. Specifically, the upper end of the oblique line 23 is fixed, and the lower end thereof is moved. As a result, the position of the longitudinal line (longitudinal side 25) contacting with the lower end is moved in parallel.

In this manner, the precision of the structure detection module is raised gradually, and the composition is changed to a level desired by the user.

When evaluating the ratio of lengths of two sides in a rectangular region, the diagonal lines of the rectangular shape are calculated, and the structure detection modules 21, 22 for golden ratio of 3×5 shown in FIG. 8 are applied to the diagonal lines. When the application of the structure detection modules 21, 22 for golden ratio of 3×5 is matched, in this rectangular region, the ratio of the longitudinal side and the lateral side is detected to be a specified value (a value within a specified range from the golden ratio). By gradually raising the precision of the structure detection modules, the composition is changed to a degree desired by the user.

In the embodiments, the composition lines are ranked in order of curved line, oblique line, and straight line, and by moving the line of the lower rank, the composition is changed. The coordinates of the endpoint of each composition line are moved, and a new composition line is calculated. In this case, the end point is ranked by the position in order of the end of an image, the side of an image, and the inside of an image, and the position of the lower rank is moved.

The method of determining the composition may be also varied or modified in various manners.

(8) Step S8 Output of the Composition

The created composition is output, recorded in the memory 7, and displayed on the display 5.

Figure 10:
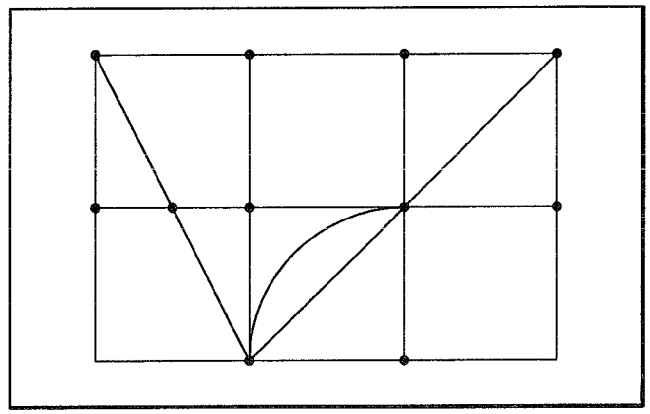
FIG. 10 is a diagram for explaining a finally obtained composition.

The composition to be output is, as shown in FIG. 10, data having information of coordinates of end points of composition lines, and connection mode between end points. The composition recorded in the memory 7 is recorded in a layer different from the layer of the original image.

(9) Step S9 Processing and Output of Moving Image

The generation of an image is completed in steps S1 to S8. In this embodiment, the CPU 6 generates a dynamic animation by making use of this composition. This process is not included in the main body of the compositional analysis program, but is executed according to a different program module belonging to this compositional analysis program.

Figure 11:
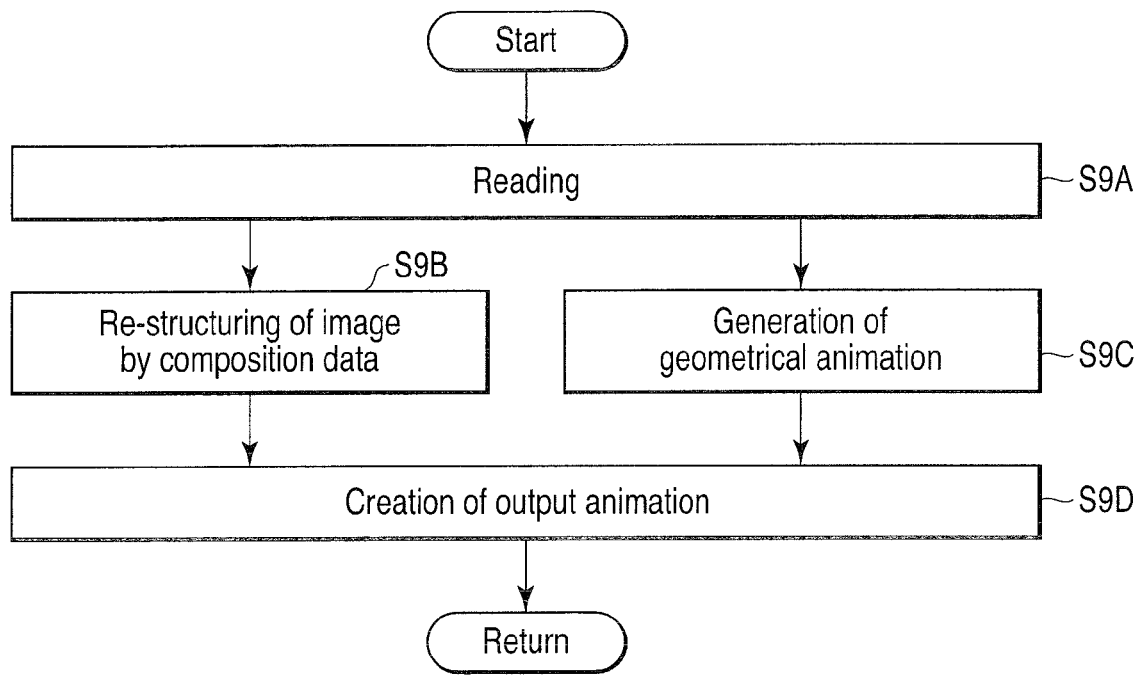
FIG. 11 is a flowchart for explaining a process for generating an output animation.

To outline step S9, in sub-step S9A in FIG. 11, the CPU 6 reads the created compositional data from the main body of the compositional analysis program. In sub-step S9B, in each region of the composition, a desired image or a part of the desired image is adhered. In sub-step S9C, a geometric animation changing continuously from one composition to another composition is created. In sub-step S9D, the created geometrical animation is synthesized with the image having the image adhered in sub-step S9B as the initial value, and a combined image is output.

Each sub-step will be specifically described below.

(10) Sub-step S9A

First, in sub-step S9A, this module automatically reads the composition created in the compositional analysis program main body. This compositional analysis program is assumed to continue execution of process sequentially after creating the first composition, by processing a next image and creating a composition.

(11) Sub-step S9B

In sub-step S9B, a first image (frame) of the animation is created. Specifically, of the compositions read in sub-step S9A, using the first composition, each image is adhered to each region of the composition, and an image is created. The images to be adhered are selected from a plurality of images (photo database) stored in the external storage device 4 according to the following condition.

1. Similarity in Color

Images stored in the external storage device 4 are classified by colors, and images of the same or similar color are selected.

First, one image is compared with another image. As a result of comparison, if color distributions are matched, these images are added to a list of candidates relating to the specific color.

Images not matched in color are changed in the brightness, chroma saturation, and hue in a specified range, after which it is judged whether color distributions are matched or not. If matched, the images are added to the list of candidates. If not matched, the images are not added to the list of candidates. In this way, the list of candidates is built up.

2. Similarity in Shape

Images stored in the external storage device 4 have been once analyzed structurally at the moment of storage, and are saved as geometrical parts. The shape of these parts is compared with the shape of each region in the read composition, and depending on the similarity in shape (congruent or similar), images of higher similarly are added to the list of candidates.

That is, not limited to the similarity in shape extracted from the composition of the entire picture, it is also possible to collate the shape of the inside image composition as for the cropping image of geometrical region level partitioned by line segments composing the composition.

3. Tag Information

A key word is added to any image stored in the external storage device 4. This key word is not particularly limited, including, for example, "sea," "travel," "baseball," and "cold." Plural key words may be added to one image. In this embodiment, the key word can be designated by a user, and images belonging to the same key word range are registered in the list of candidates about the same key word.

On the basis of these three conditions, an image extracted from the external storage device 4 is adhered to each region in the read composition, and an image is re-composed.

(12) Sub-step S9C

At this sub-step S9C, from the plurality of compositions read in sub-step S9A, an animation changing continuously from one composition to another composition is created.

Change from one composition K(i) to another composition K(i+1) is always executed point by point. One apex is extracted from composition K(i), and an apex of composition K(i+1) corresponding to the former apex is detected. At this time, if the corresponding apex is not found in composition K(i+1), other apex is selected from composition K(i).

Next, the apex of composition K(i) is moved to the corresponding apex of composition K(i+1). In this case, if this apex relates to the golden ratio, it is moved while the golden ratio is maintained. That is, in spite of the animation, if cut off as a still image at any moment, the frame always maintains the composition based on the golden ratio. The sequence of apices to be selected is selected by the rule based on a Fibonacci sequence of numbers.

In the change from composition K(i) to composition K(i+1), if the number of regions is excessive or insufficient, the regions may be divided or united in the process of the change.

In the animation, when the change from composition K(i) to composition K(i+1) is completed, creation of an animation changing from composition K(i+1) to composition K (i+2) is started. Similarly, animations changing from one composition to another composition are created continuously.

All regions partitioned by the apices seen inside the created animation are processed as independent layer information in the operation and creation in the next process. Accordingly, the region enclosed by the apices is used as the apex coordinates information, and is saved in the memory 7 as mask information.

Figure 12:
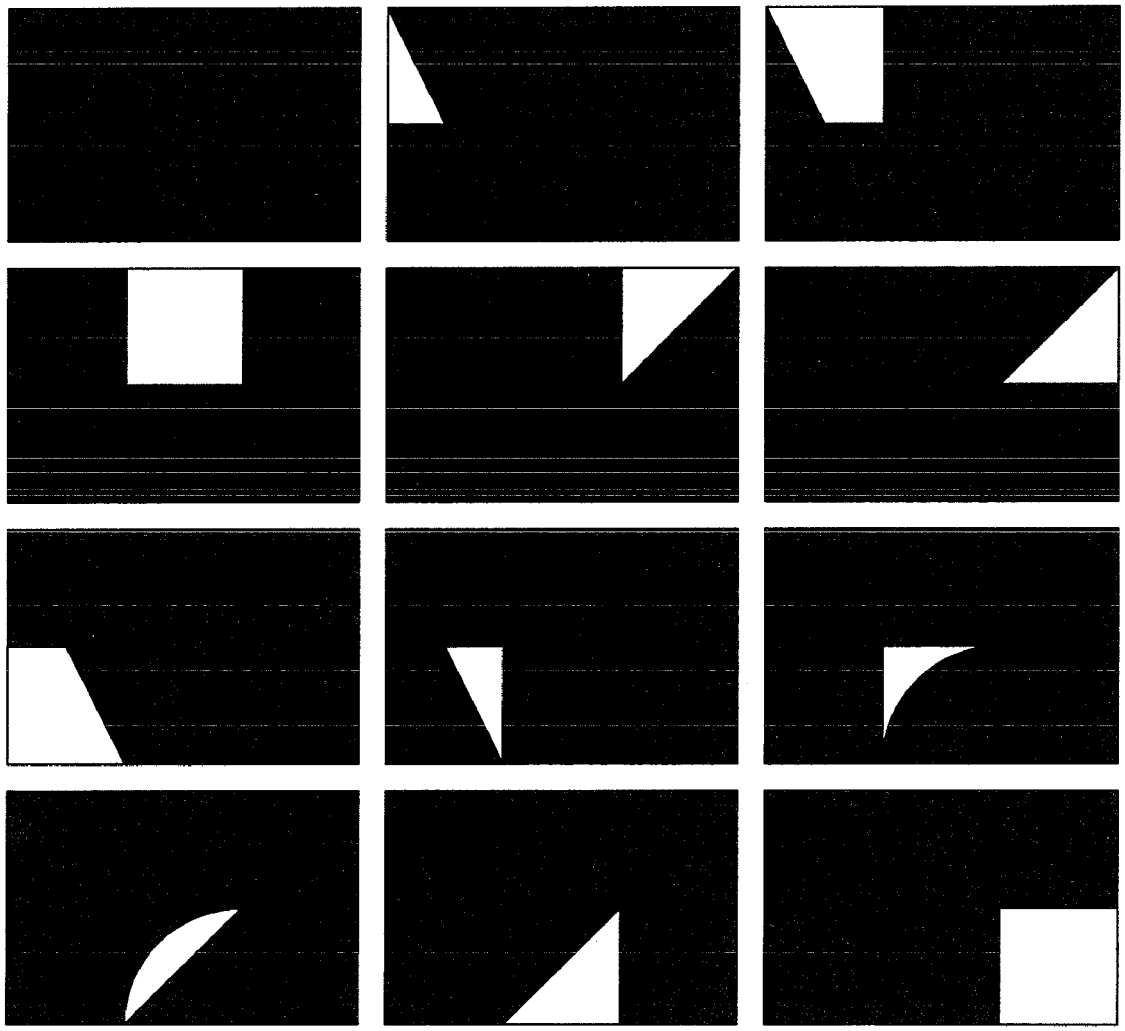
FIG. 12 is a diagram showing a plurality of mask information generated from the composition.

Referring to an example of composition shown in FIG. 10, the mask information (mask images) as shown in FIG. 12 is cut off from the composition.

(13) Sub-Step S9D

Further, by receiving the processing results of sub-steps S9B and S9C, an animation is created. What is prepared at this point is the first frame (output of sub-step S9B) prepared for animation, and the geometrical animation starting from this frame and its mask information (output of sub-step S9C). On the basis of these two materials, an animation is created by making use of the following effects.

1. Replacement of Internal Image by Shape and Color

In an output animation, every time one apex is moved and stopped, images of changed regions (there are at least two regions because the apex is shared by at least two regions) are replaced with other images read from the external storage device 4. This replacement rule conforms to the rules 1 to 3 explained in sub-step S9B, and color changes due to hue, brightness, and chroma saturation are also displayed as an animation.

2. Color Change (Chameleon Algorithm)

When two different images are adjacent to each other, they are connected linearly by analyzing the difference of boundaries, and color changes are expressed by animation. Therefore, the following process (chameleon algorithm) is executed.

Figure 13A:
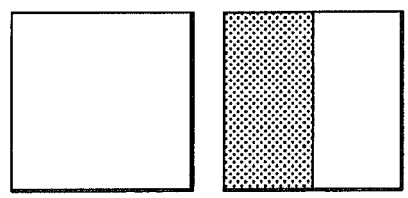
FIG. 13A is a diagram showing two images.
Figure 13B:
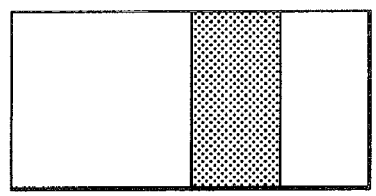
FIG. 13B is a diagram showing a state of connecting the two images in FIG. 13A.
Figure 13C:
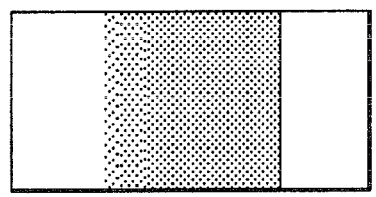
FIG. 13C is a diagram showing results of processing for matching color information between adjacent images in the two connected images in FIG. 13B.

The square at the left side of FIG. 13A is a constituent region (image) of the composition provided with a color changing attribute (chameleon attribute). The square at the right side is a constituent region (image) of the composition not provided with the attribute. As shown in FIG. 13B, when the two regions contact with each other, as shown in FIG. 13C, the region provided with the color changing attribute is influenced by the partner's color information (brightness, chroma saturation, color), and changes its own color.

Thus, when the color information of a region is changed due to the effect of the color information of the adjacent region, the entire region is changed according to the sequence of hue circle (PCCS hue circle, Munsell hue circle, Ostwald hue circle, etc.). Specifically, assume that the color near the boundary is changed from red to yellow. If the change from red to yellow is a portion of two colors in distance on the hue circle, the light blue color on the same region is also changed for the portion of two colors (for example, changed to a deep blue color). As a result, monotonous color change is prevented.

The color change becomes weaker as the distance is longer from the boundary, and the effect is not extended farther than the center of gravity of the region.

3. Other Changes

A more dynamic animation can be created by other changes, such as transparency, rotation, expansion, or contraction of the image.

Thus, according to the embodiment, a composition is extracted from the image, and at least a part of the composition is changed on the basis of the golden ratio. As a result, an aesthetically excellent composition can be easily created from the image.

Besides, while maintaining the golden ratio, an animation is created for smooth transition from one composition to another composition. As a result, an aesthetically excellent composition change can be presented.

In the animation of the composition transition, images are adhered to the region of the composition, and the images are changed dynamically. As a result, aesthetically excellent images can be displayed dynamically.

[Second Embodiment]

The second embodiment of the invention will be explained. In this embodiment, the function of the first embodiment for analyzing the composition in consideration of the golden ratio of the image is applied to a digital camera as an image apparatus.

More specifically, composition lines are displayed by superposing the monitor image of the subject on the monitor of the digital camera. Moreover, if the composition reflects the golden ratio due to the changes in the camera position, posture, focal length or others, the color of the composition lines is changed, and it is recognized by the user. Furthermore, in the camera monitor, the user is informed of the advice information about how to change the camera position, posture, focal length or others.

In the digital camera of the embodiment, in order to execute such compositional analysis, so-called over-framing is established, that is, the range actually imaged by the camera is wider than the range observed by the user through a finder.

Figure 14:
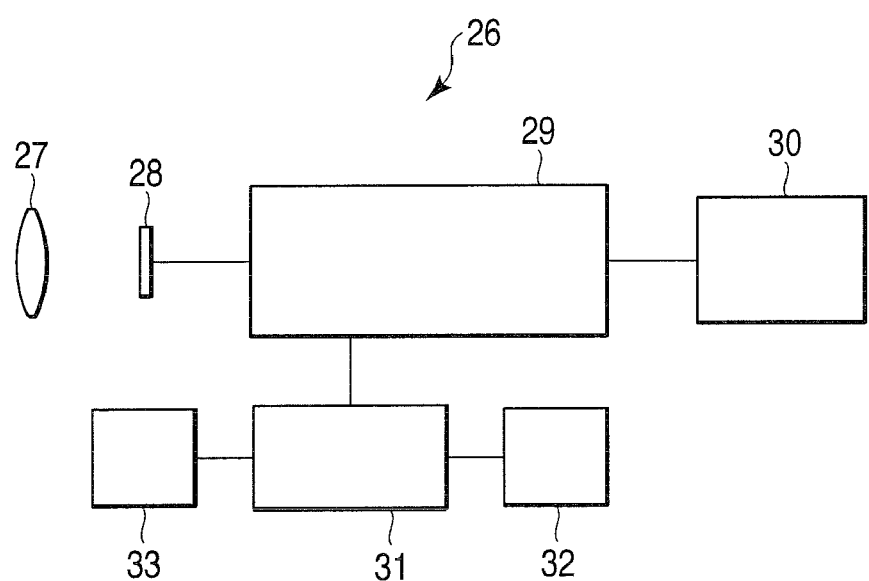
FIG. 14 is a block diagram of a digital camera as an image apparatus according to a second embodiment of the invention.

As shown in FIG. 14, a digital camera 26 of the embodiment includes an imaging lens 27, an imager 28 focused a subject image by the imaging lens 27, and an image processing unit 29 for processing an image signal output from the imager 28. A monitor 30 is connected to the image processing unit 29. A CPU 31 for controlling the entire operation of the digital camera 26 is connected to the image processing unit 29. The CPU 31 is connected to a ROM 32 as a recording medium storing the control program, and to a recording medium 33 for recording the image.

The ROM 32 stores the compositional analysis program for realizing the compositional analysis method of the invention.

Figure 15:
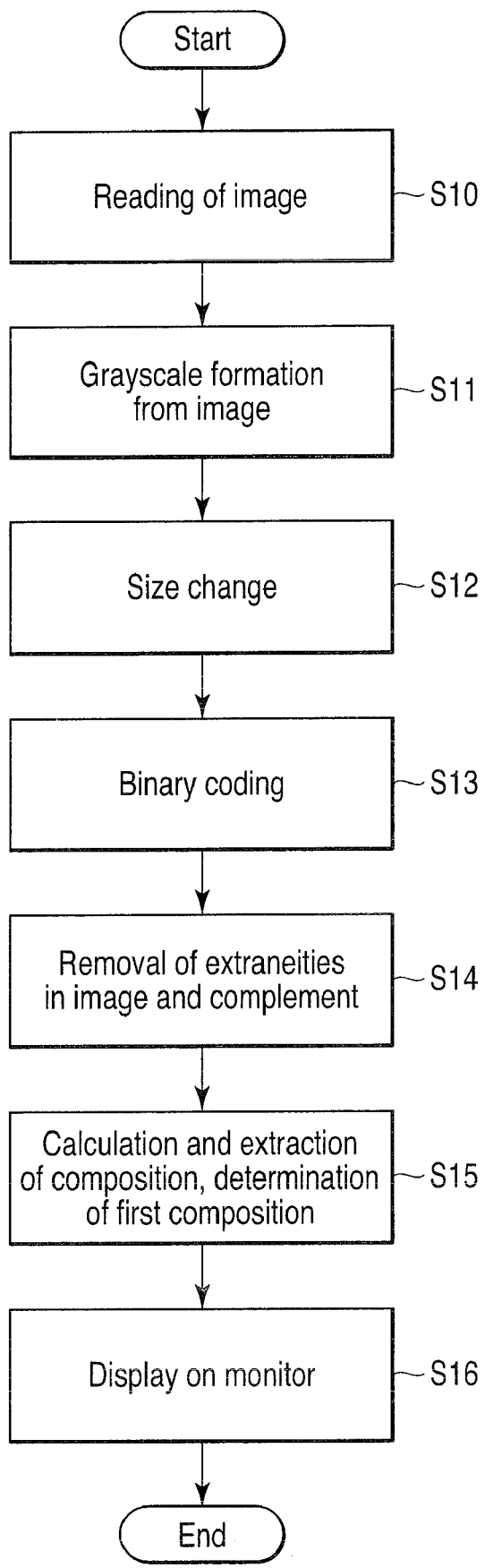
FIG. 15 is a flowchart for explaining the operation of a CPU.

In the digital camera 26 having such configuration, while the user is displaying a live view on the monitor 30 as preparation for photographing, when the function of this compositional analysis program is made active, the processing shown in the flowchart in FIG. 15 is executed.

In the flowchart in FIG. 15, this compositional analysis program is read into the CPU 31 from the ROM 32, and is executed. The flowchart in FIG. 15 is similar to the flowchart in FIG. 2 in most steps. Only the different steps will be explained below.

(14) Step S10 Reading of Image

In the digital camera 26, if the user is displaying a live view image on the monitor 30, it is the image data acquired by the imager 28 and processed in the image processing unit 29 is input to the CPU 31 in real time.

(15) Steps S11 to S15

Figure 2:
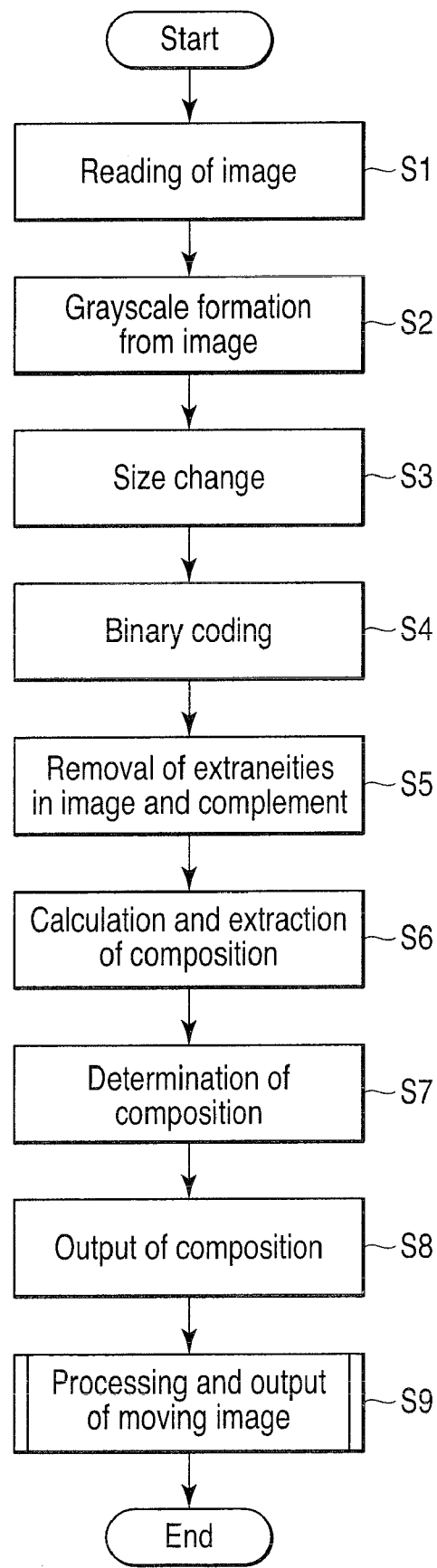
FIG. 2 is a flowchart for explaining the operation of a CPU.

The process from step S11 to step S15 is the same as in step S2 to step S6 in the flowchart in FIG. 2, and the explanation thereof is omitted.

In this embodiment, the composition composed of composition lines acquired in step S15 (same as step S6) is called a first composition.

(16) Step 16 Output to Monitor

Next, in step S16, the first composition thus created is superposed on the monitor display, and displayed in the monitor 30.

For example, as shown in FIG. 16A, while the monitor 30 is displaying a live view not superposed with the composition lines, when this compositional analysis function is made active, an image as shown in FIG. 16B is displayed. In the image in FIG. 16B, the acquired composition lines (indicated by broken lines in the diagram) are superposed and displayed on the live view. This image is updated in real time.

Herein, when the camera composition is changed and the golden ratio is detected in the composition of the image, the color of the composition line for detecting the corresponding portion is changed, and is automatically locked on in the image. The detection precision of the golden ratio may be set in plural stages as explained in the first embodiment, but in this embodiment the color is changed to vary the composition line depending on the precision (for example, from blue to green to pink). It is therefore possible to judge, by the color, at which degree of precision the golden ratio is detected. This mode is shown in FIG. 16C. The thick line shows the composition line changed in color.

Figure 16D:
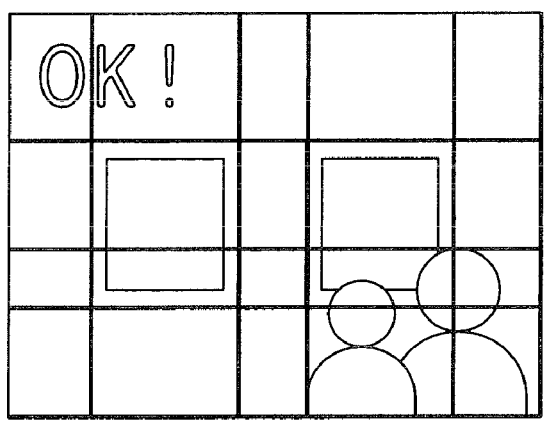
FIG. 16D is a diagram showing a display example judged to be sufficiently aesthetic as a composition.

When the relation of golden ratio is found in many composition lines and the composition is judged to be aesthetic sufficiently, as shown in FIG. 16D, the monitor 30 displays "OK!" showing the approval. In this embodiment, this display is shown when the color is changed in 70% or more of the composition lines.

Hence, the user easily judges if the image is beautiful or not in terms of composition on the monitor 30.

Of course the user may be guided to a more preferable composition. For example, since the distance to the subject may be known by a distance measuring unit (not shown) of the digital camera 26, an appropriate distance from the subject to the digital camera 26 may be displayed on the monitor, so that the image may be shown more aesthetically in composition. For example, the display may be "move closer by 1 m" or "move to right by 30 cm."

If the digital camera 26 is a zoom camera having a zoom lens, the framing range may be changed by zooming and the composition may be adjusted. Alternatively, the user may be instructed to change he focal distance by using other lens.

Together with the actually acquired composition lines, the target composition lines for realizing the golden ratio may be expressed at the same time, and the user may be advised to change the camera parameters (position, posture, focal length, etc.) so that the both composition lines may be matched.

This embodiment is realized by the so-called over-framing, that is, the range actually imaged by the camera is wider than the range observed by the user through a finder. Since the range actually imaged is wider than the range observed by the user, various compositional variations can be presented to the user. Besides, after image acquisition, a wide variety of compositional variations may be presented to the user.

The embodiment realizes a digital camera capable of acquiring an image having an aesthetically excellent composition easily.

[Third Embodiment]

The third embodiment of the invention will be explained.

In this embodiment, a plurality of composition lines are acquired from the entered image data, and the ratio of lengths of two sides selected from the plurality of sides of the region partitioned by the composition lines is analyzed, whereby a plurality of cropping regions are determined (first cropping region group). The route for linking the plurality of cropping regions thus obtained is determined. At the plurality of points on the route, the ratio of lengths of two sides selected from the plurality of sides in the region partitioned by the composition lines is analyzed, whereby cropping regions are determined (second cropping region group). The determined first cropping region group and second cropping region group are sequentially displayed according to the route, and the cropping regions in the first cropping region group are displayed like a moving image acquired sequentially by smooth camera work.

In the third embodiment, the cropping result is supposed to be reproduced by high-definition television, and the aspect ratio of the cropping regions is specific at a ratio of 16:9 (the aspect ratio of high-definition television) or 9:16 of vertical display. The number of pixels in the cropping region is not particularly specified, but the number of pixels should be enough to assure a certain quality when displayed on a high-definition television monitor. The input image is not limited in the aspect ratio, but the definition should be high enough to have a sufficient number of pixels capable of designating a plurality of cropping regions.

The environment realized by the third embodiment is the same as the configuration of the first embodiment shown in FIG. 1, and the explanation thereof is omitted.

The memory 7, which is a computer-readable recording medium, stores the compositional analysis program for realizing the compositional analysis method of the embodiment. When the user operates as specified, the CPU 6 reads the compositional analysis program from the memory 7, and executes it.

Figure 17:
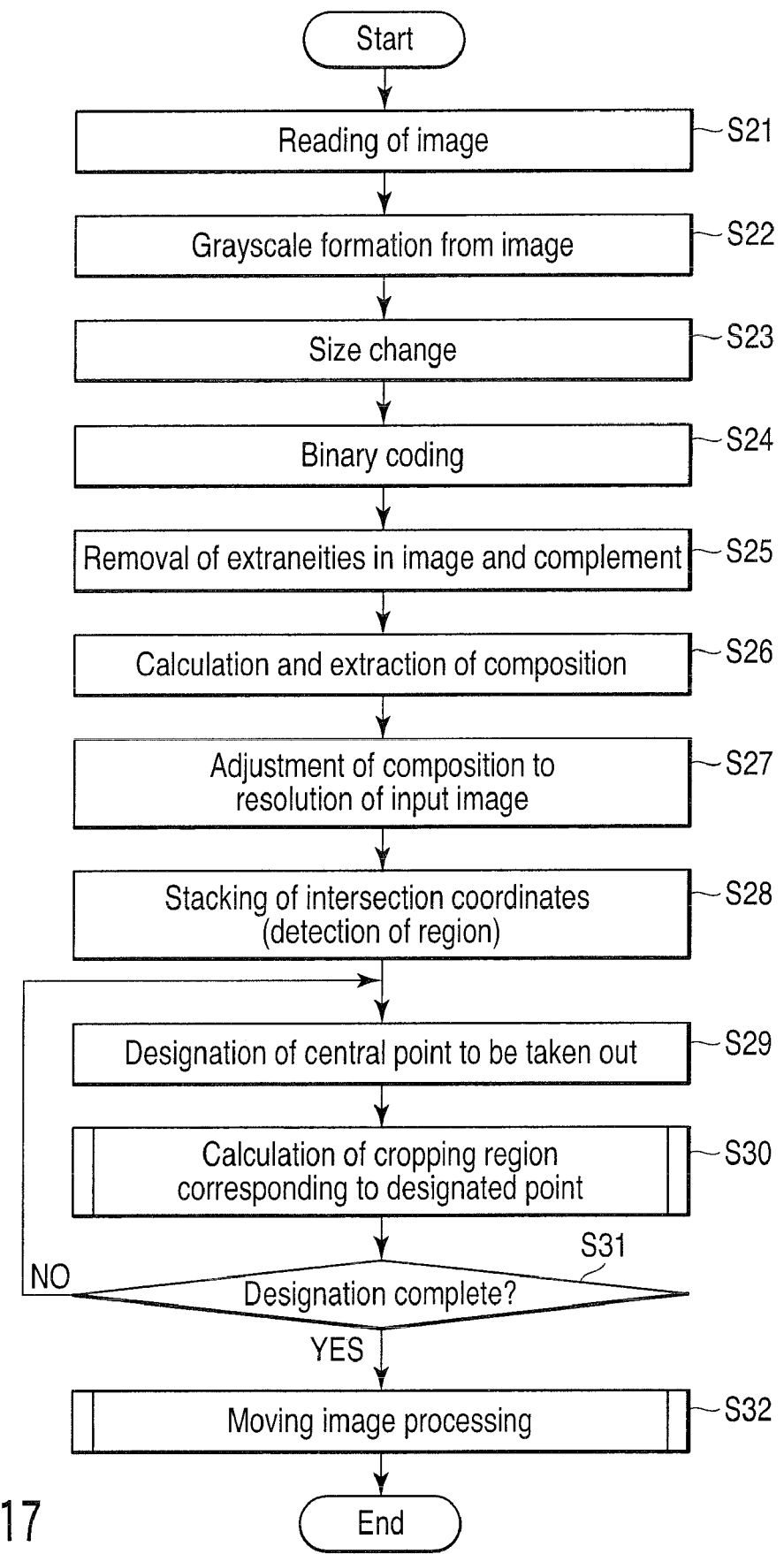
FIG. 17 is a flowchart for explaining the operation of a CPU in a third embodiment of the invention.

The operation of the CPU 6 for executing the compositional analysis program will be explained by referring to FIG. 17. The flowchart in FIG. 17 is similar to the flowchart in FIG. 2 in most of the steps. Only the different steps will be explained below.

(17) Step S21 Reading of Image

Basically, this is the same as step S1 in the flowchart in FIG. 2. However, if the number of pixels of the input image is more than the processing capacity of the computer, the number of pixels may be decreased.

Figure 18A:
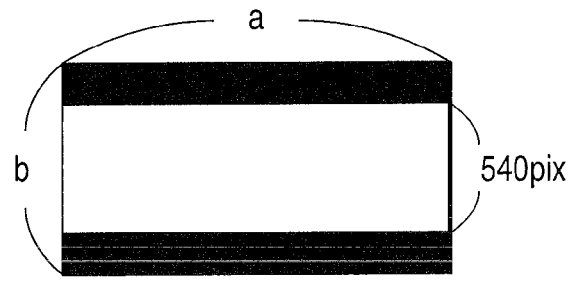
FIG. 18A is a diagram for explaining conversion for reducing the number of pixels in a lateral image.
Figure 18B:
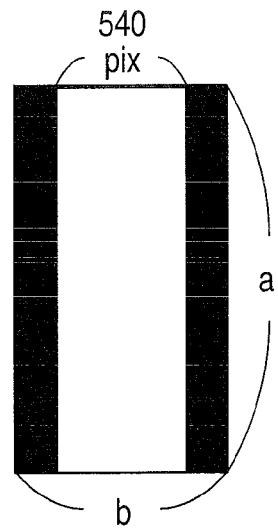
FIG. 18B is a diagram for explaining conversion for reducing the number of pixels in a longitudinal image.

An example of the process of decreasing the number of pixels will be explained by referring to FIGS. 18A and 18B. In the diagrams, the white portion is the input image after conversion of decreasing the number of pixels. Herein, the input image is decreased in the number of pixels until the number of pixels of the shorter side becomes 540 pixels. This value of 540 pixels is determined based on the shorter side of the image (940×540) occupying a quarter area of the number of pixels of 1920×1080 of full-specification high-definition television.

Black belts are added to the upper and lower sides or right and left sides of the white input image (already decreased in the number of pixels), and the aspect ratio (a:b) of the entire processed image is adjusted to be the same as the aspect ratio (16:9) of high-definition television. Thus, the process is standardized.

Figure 19:
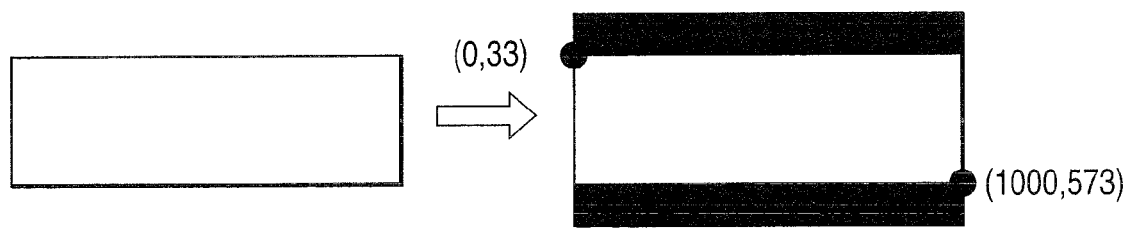
FIG. 19 is a diagram for explaining stacks of coordinate values showing in which region of the converted image an input image is present.

At the time of cropping process, in order to remove the black belts, before adding the black belts of the image, the number of pixels is checked. Then, as shown in FIG. 19, it is intended to stack the coordinate values showing in which region of the image after conversion the input image (already decreased in the number of pixels) is present.

(18) Step S22 Grayscale Formation From Image

Basically, this is the same as step S2 in the flowchart in FIG. 2. However, the image conversion may be improved by providing a pre-process for grayscale formation. In the third embodiment, the image is processed by 27-value coding as the pre-process.

In 27-value coding, the luminance of each of R, G, B colors of the input image is divided into three stages, and classified into a total of 27 types, that is, 3×3×3=27. Boundary values of classification in three stages are determined depending on the types of the input image. For example, when the luminance of each color is expressed in a scale of 0 to 1, if the input image is a Japanese painting with a yellow background, R has boundary values of 0.6 and 0.3, G has 0.8 and 0.3, and B has 0.5 and 0.2.

By this 27-value coding, the colors can be weighted depending on the type of the input image. For example, a color visually looking like a uniform color, for example, the background color not particularly contributing to the composition of the painting is prevented from being classified into multiple stages.

(19) Step S23 Change of Size

Basically, this is the same as step S3 in the flowchart in FIG. 2, and the explanation thereof is omitted.

(20) Step S24 Binary Coding

Basically, this is the same as step S4 in the flowchart in FIG. 2, and the explanation thereof is omitted.

(21) Step S25 Removal of Extraneities in Image and Complement

Figure 20:
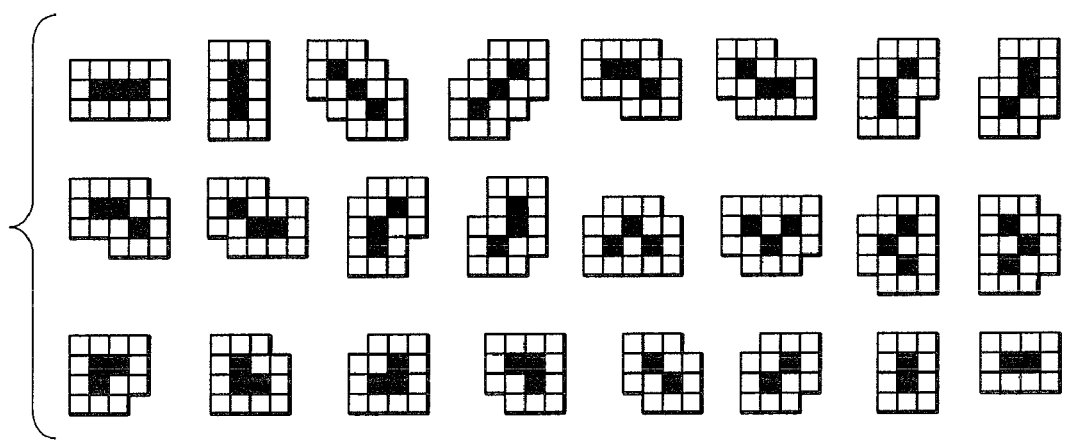
FIG. 20 is a diagram showing a plurality of templates used in extraneity removal and interpolation in the image.

Basically, this is the same as step S5 in the flowchart in FIG. 2. In the third embodiment, however, by using the templates shown in FIG. 20, the extraneities are removed more carefully. FIG. 20 shows only the templates having a black portion in the inside and a white portion in the periphery, but templates reversed in black and white colors are also prepared. The templates are fitted to the images after binary coding, and when matched, the black and white colors are inverted in the pixel at the inside of the template.

In this case, in order not to increase the number of templates excessively, the extraneities are removed after adjusting the number of pixels in the input image. In the third embodiment, four types of resolution are prepared, that is, 32×18 pixels, 64×36 pixels, 128×72 pixels, and 256×144 pixels. In the case of 32×18 pixels, the extraneities are removed in the unit of one pixel as in the first embodiment. In other types of resolution, the extraneities are removed in the unit of one pixel, and at the same time, the extraneities are removed in the unit of an arbitrary number of pixels of more than one pixel. For example, to remove an extraneity in 3 pixels, the template in FIG. 20 is used.

(22) Step S26 Composition Calculation and Extraction

In the third embodiment, vertical and lateral composition lines are extracted in the following method in order to shorten the processing time. For oblique composition lines, the templates are used as in the first embodiment.

Lateral composition lines are acquired in the following procedure.

1. In each row in the image, a pixel column having three or more black pixels continuous laterally is extracted.

2. The number of pixel columns is summed up in each row.

3. When the number of pixel columns is more than specified (for example, 3 or more), lateral composition lines are acquired.

Longitudinal composition lines are similarly acquired in the following procedure.

1. In each column in the image, a pixel column having three or more black pixels continuous longitudinally is extracted.

2. The number of pixel columns is summed up in each column.

3. When the number of pixel columns is more than specified (for example, 3 or more), longitudinal composition lines are acquired.

By changing the specified number, the sensitivity for acquisition of composition lines can be adjusted.

Figure 21A:
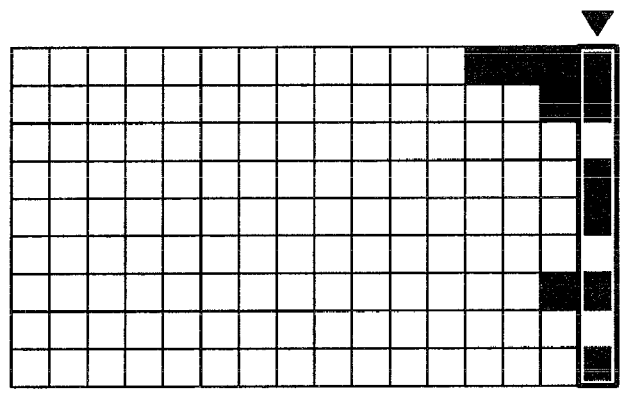
FIG. 21A is a diagram for explaining a case of summing up lines with one or more pixel columns of three black pixels continuous laterally.
Figure 21B:
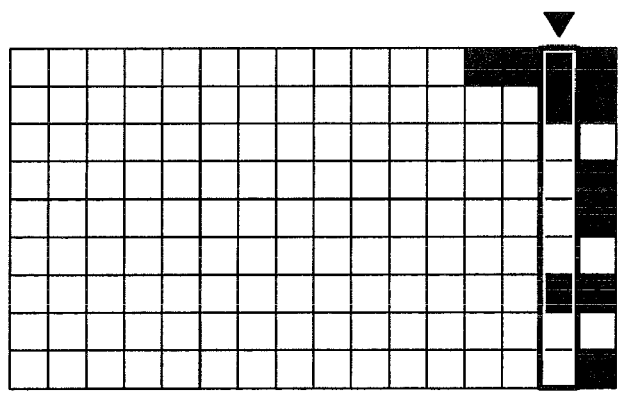
FIG. 21B is a diagram for explaining a case of summing up lines with two or more pixel columns of three black pixels continuous laterally.

FIGS. 21A to 21D are diagrams schematically explaining the mode of this operation. In FIGS. 21A and 21B, one of the pixel columns having three black pixels continuous laterally is expressed by a black square. The black squares are shifted to the right side because a bar graph is composed of black squares by shifting all the black squares to the right side when summing up the number of pixel columns in each row, and the summing result of the number of pixel columns in each row is judged by the length of the bar graph.

FIG. 21A refers to the rightmost column. In this reference, rows having black squares are rows having at least one pixel column having three black pixels continuous laterally. FIG. 21B refers to the second rightmost column. In this reference, rows having black squares are rows having at least two pixel columns having three black pixels continuous laterally. In FIG. 21B, the two pixel columns are either continuous or separate.

Figure 21C:
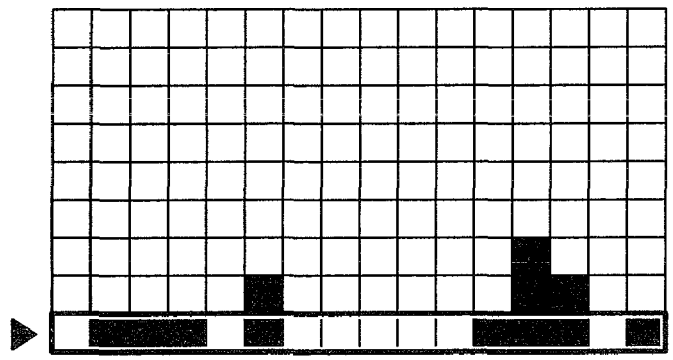
FIG. 21C is a diagram for explaining a case of summing up lines with one or more pixel columns of three black pixels continuous longitudinally.
Figure 21D:
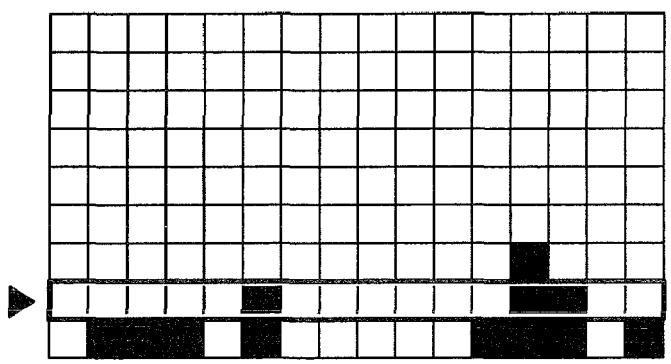
FIG. 21D is a diagram for explaining a case of summing up lines with two or more pixel columns of three black pixels continuous longitudinally.

In FIGS. 21C and 21D, one of the pixel columns having three black pixels continuous longitudinally is expressed by a black square. The black squares are shifted to the bottom side because a bar graph is composed of black squares by shifting all the black squares to the bottom side when summing up the number of pixel columns in each column, and the summing result of the number of pixel columns in each column is judged by the length of the bar graph.

FIG. 21C refers to the bottom column. In this reference, columns having black squares are columns having at least one pixel column having three black pixels continuous longitudinally. FIG. 21D refers to the second column from the bottom. In this reference, columns having black squares are columns having at least two pixel columns having three black pixels continuous longitudinally. In FIG. 21D, the two pixel columns are either continuous or separate.

(23) Step S27 Adjusting the Composition to the Resolution of Input Image

In the foregoing step, the number of pixels in the input image has been decreased in order to enhance the processing speed. In this step, the precision of the compositional data is adjusted to the input image.

Figures 22A, 22B, 22C, 23:
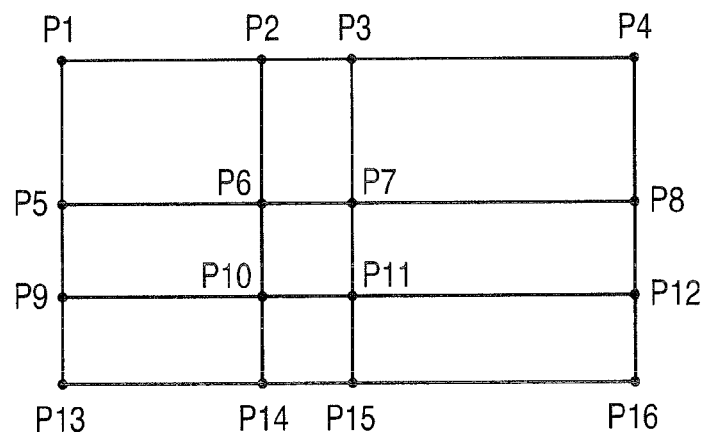
FIG. 22A is a diagram showing scaled-down pixel columns.
FIG. 22B is a diagram showing pixel columns simply multiplied by 10 times from the pixel columns in FIG. 22A.
FIG. 22C is a diagram showing pixel columns multiplied by 10 times from the pixels columns in FIG. 22A in the third embodiment.
FIG. 23 a diagram for explaining stacks of intersection coordinates of acquired composition lines.

Herein, the coordinate positions are not merely multiplied by a constant, but mismatching due to data expansion is adjusted. For example, when a pixel column scaled down as shown in FIG. 22A is magnified by 10 times, if simply multiplied by a constant, as shown in FIG. 22B, a black square appears in the beginning pixel in 10-pixel section of magnified pixel columns. In the third embodiment, as shown in FIG. 22C, a black square appears nearly in the center of the 10-pixel section.

(24) Step S28 Stacking of Intersection Coordinates

As shown in FIG. 23, coordinates of each intersection of the acquired composition lines are stacked up.

(25) Step S29 Designation of Central Point to be Taken Out

The user designates the point desired to be included in the cropping region in the input image. For example, when desired to include a human face in the cropping region, one point of the face is designated. In this designation, the input image is displayed on the display 5, the one point of the image is selected by a user with a mouse, and is clicked. Herein, the central point is the center of the region of interest for the user, not the center of the cropping region. Therefore, the central point does not always coincide with the final center of the cropping region.

Of course, plural points may be designated to be included in the cropping region. Alternatively, instead of designation of central point by the user, the system may automatically detect and designate the feature point in the input image.

(26) Step S30 Calculation of Cropping Region with Respect to Designation Point

This step is intended to calculate the best cropping region in consideration of the golden ratio about the designation point. This processing step will be explained by referring to FIG. 24.

(27) Sub-step S30A Drawing a Plurality of Oblique Lines from Designation Point Radially First, from the center of the designation point, several oblique lines are calculated. FIG. 25A and FIG. 25B show modes of calculating and drawing golden ratio oblique lines 34 and 16:9 oblique lines 35 as oblique lines from the designation point P. FIG. 25A shows a small inclination, and FIG. 25B shows a large inclination. Besides, for example, silver ratio oblique lines may be calculated and drawn. For example, in the case of golden ratio oblique lines, the bottom and the height of the oblique lines maintain the relationship of the golden ratio.

(28) Sub-step S30B Determination of First Cropping Point

By using the oblique lines drawn in sub-step S30A, a first cropping point is determined. In this embodiment, the first cropping point is determined by mainly using the golden ratio oblique line 34.

The first cropping point is determined in the following priority order.

1. Crossing of golden ratio oblique line 34 and intersection of longitudinal and lateral composition lines.
2. Passing of golden ratio oblique line 34 within 25 pixels from the intersection of longitudinal and lateral composition lines.
3. In a small inclination, positioning of the intersection of longitudinal and lateral composition lines between golden ratio oblique line 34 and 16:9 oblique line 35.
4. In a large inclination, positioning of the intersection of longitudinal and lateral composition lines between golden ratio oblique line 34 and 16:9 oblique line 35.

Figure 26A:
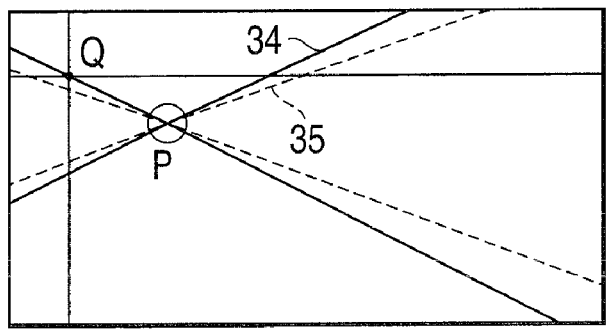
FIG. 26A is a diagram showing a decision example of a first cropping point.
Figure 26B:
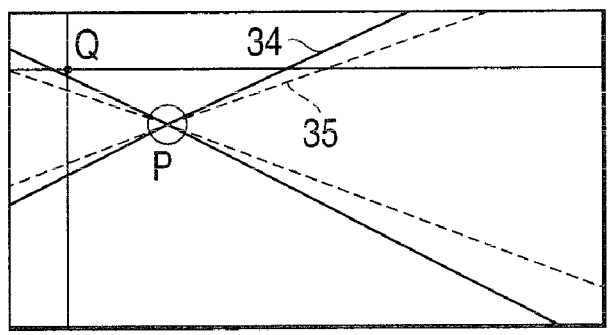
FIG. 26B is a diagram showing another decision example of the first cropping point.
Figure 26C:
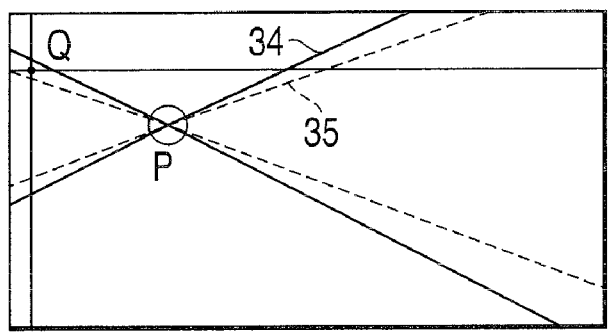
FIG. 26C is a diagram showing still another decision example of the first cropping point.

FIG. 26A shows a case of conforming to condition 1, FIG. 26B shows a case of conforming to condition 2, and FIG. 26C shows a case of conforming to condition 3. Thus, the first cropping points Q are determined respectively.

If the first cropping point Q is not determined, the user is informed of this fact visually and urged to enter the designation point P again.

(29) Sub-step S30C Determination of Second Cropping Point

A second cropping point is determined.

The region to be cut off is always an area of aspect ratio of 16:9, and thus when the first and second cropping points are determined, the region is also determined automatically.

The second cropping point is determined at other intersection of longitudinal and lateral composition lines, or at an intersection of an oblique line and a composition line.

FIGS. 27A to 27D show examples of determining the second cropping point R.

Figure 27A:
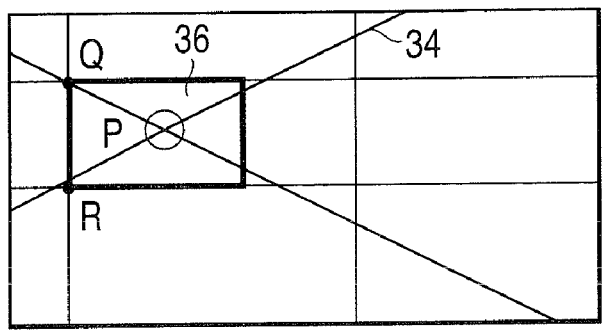
FIG. 27A is a diagram showing a decision example of a second cropping point.

FIG. 27A is an example of determining the second cropping point R at other intersection of longitudinal and lateral composition lines on the same longitudinal composition line as the first cropping point Q.

Figure 27B:
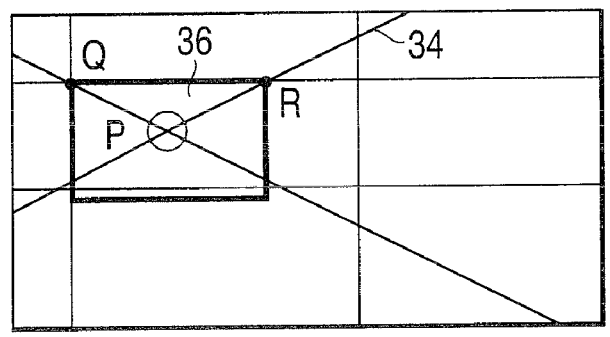
FIG. 27B is a diagram showing another decision example of the second cropping point.

FIG. 27B is an example of determining the second cropping point R at the crossing point of an oblique line symmetrical to the oblique line having the first cropping point Q with respect to the designation point P, with the lateral composition line having the first cropping point Q.

Figure 27C:
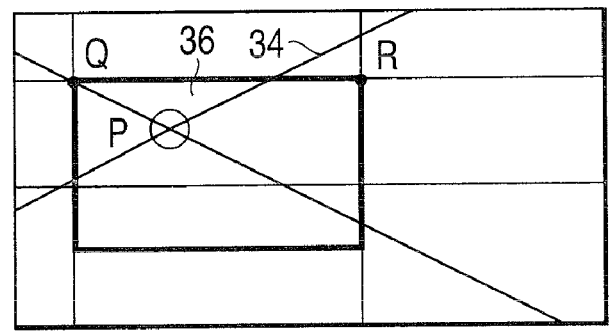
FIG. 27C is a diagram showing still another decision example of the second cropping point.

FIG. 27C is an example of determining the second cropping point R at other intersection of longitudinal and lateral composition lines on the same lateral composition line as the first cropping point Q.

FIG. 27D is an example of keeping the region having the aspect ratio of 16:9 to the lower end of the image.

In this embodiment, the cropping point is determined by setting the priority rank higher in other intersection of longitudinal and lateral composition lines.

(30) Sub-step S30D Determination of Cropping Region

In this manner, when the first cropping point Q and the second cropping point R are determined, a region 36 of aspect ratio 16:9 (lateral:longitudinal) having the first cropping point Q and the second cropping point R at the apices and including the designation point P in the inside is determined automatically.

This region 36 is extended by using the golden ratio, and the cropping region is determined.

For example, assume that, by the first cropping point Q and the second cropping point R, the region 36 is determined as shown in FIG. 28A. In this sub-step, with respect to the length ($\alpha$) of the side of this region 36, the value of $\beta(\alpha>\beta)$ conforming to the relation of the golden ratio is calculated, and the region having the length ($\alpha+\beta$) of the side as shown in FIG. 28B is determined as a cropping region 37.

The positional relation between this cropping region 37 and the original region 36 is considered to have various patterns as shown in FIGS. 29A to 29E. In this embodiment, points where the composition lines are not positioned at the ends of the screen are evaluated, and the positional relation is employed so that the centers of the original region 36 and the cropping region 37 may be matched as shown in FIG. 29E.

If the cropping region 37 exceeds the region of the original image, the region is not extended. Nevertheless, if the cropping region exceeds the region of the original image, the cropping region may be deviated. This is a case of, for example, the cropping region going out of the input image data region, or getting into the black belts in FIG. 19.

(31) Sub-step S30E Cropping

The cropping region 37 determined in the sub-step S30D is cropped.

(32) Step S31 Judging Whether the Designation is Completed or Not

Cropping of one region is completed in sub-steps S30A to S30E. Herein, judging if there is another designation point or not, and if yes, the process returns to step S29, and the same process (from designation of central point to be taken out to determination of cropping region) is repeated. Thus, in the image, a plurality of designation points P are specified, and the cropping region is determined according to each designation point P.

(33) Step S32 Processing of Moving Image

An outline of moving image processing will be explained by referring to FIG. 30A to FIG. 30D.

FIG. 30A is a process before step S32, showing that a plurality of designation points P are set as mentioned above.

Figure 30B:
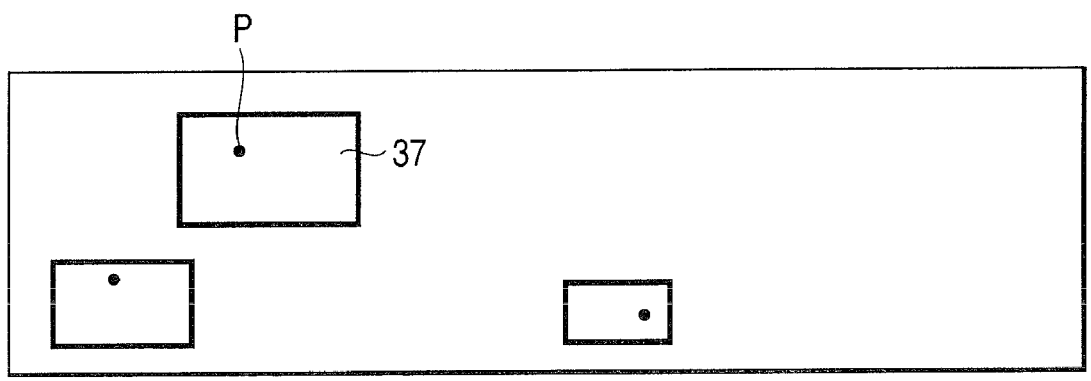
FIG. 30B is a diagram showing determination of the cropping region in each designation point.

FIG. 30B is a process before step S32, showing that the cropping region 37 is determined at each designation point P.

The following is the process of step S32.

Figure 30C:
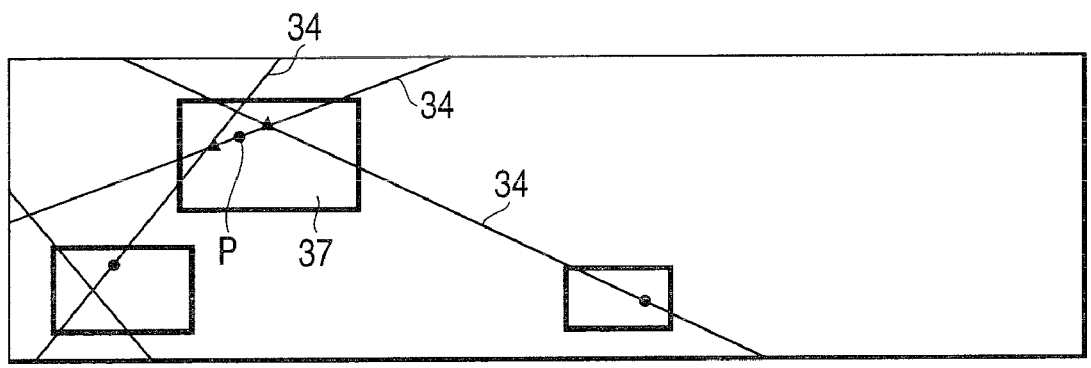
FIG. 30C is a diagram showing the intersection of golden ratio oblique lines in each designation point.

As shown in FIG. 30C, the golden ratio oblique lines 34 at each designation point P (same as determined in sub-step S30A) are extended, and their intersections (indicated by dark triangles in the diagram) are determined.

Figure 30D:
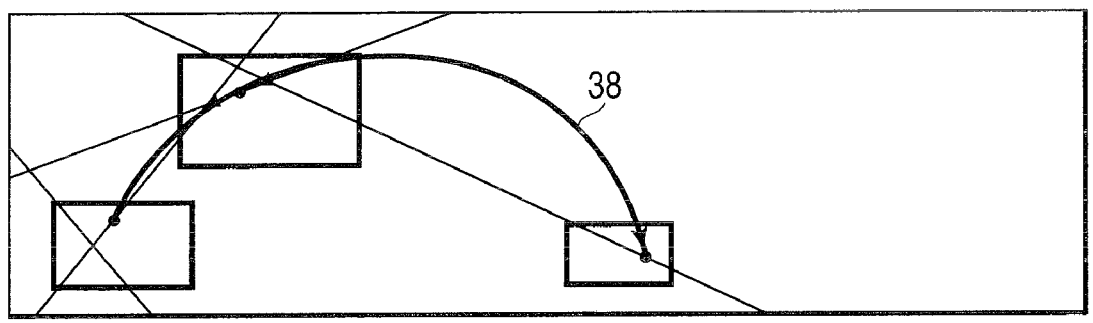
FIG. 30D is a diagram for explaining a method of displaying a moving image.

Next, as shown in FIG. 30D, supposing the intersections to be intermediate points, a curved line linking each designation point P is calculated. For example, a Bezier curve 38 is calculated. Along this Bezier curve 38, each cropping region 37 is displayed continuously. As a result, without changing over the cameras, an image is obtained in which each cropping region 37 is taken successively. In the middle of the cropping region 37, the size of the image is changed naturally. In this embodiment, the change rate of the image size change is determined by the quadratic function, and the change rate is decreased at the beginning and end of the change. As a result, a smooth size change is expressed. For calculation of the curved line, Bezier curve is proposed as an example, but it is also possible to use spline curve, curve function of a golden ratio constant, or a curve using a curvature beauty created by a Fibonacci sequence of numbers.

Thus, in the dynamic image processing, by setting the route linking a plurality of cropping regions 37, the images are displayed as if acquired continuously by a camera along the route from an image of one cropping region 37 to an image of other cropping region 37.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image apparatus comprising:
    an acquisition unit configured to acquire image data;
    an acquiring unit configured to acquire a plurality of line segments expressing features of the image data on a composition;
    a detecting unit configured to detect a ratio of lengths of two sides selected from a plurality of sides in a region partitioned by the plurality of line segments on the composition formed of the plurality of acquired line segments;
    a comparing unit configured to compare the ratio of lengths of the two sides to an other ratio; and
    a modifying unit configured to modify the ratio of the lengths of the two sides based on the comparison with the other ratio.

2. The image apparatus according to claim 1, wherein the image apparatus includes a digital camera.

3. A computer-readable recording medium having recorded therein a compositional analysis program for causing a computer to execute:
    acquiring image data;
    acquiring a plurality of line segments expressing features of the image data on a composition;
    detecting a ratio of lengths of two sides selected from a plurality of sides in a region partitioned by the plurality of line segments on the composition formed of the plurality of acquired line segments;
    comparing the ratio of lengths of the two sides to an other ratio; and
    modifying the ratio of the lengths of the two sides based on the comparison with the other ratio.

* * * * *